(12) United States Patent
Leng et al.

(10) Patent No.: US 12,543,135 B2
(45) Date of Patent: *Feb. 3, 2026

(54) UPLINK TIMING AND FREQUENCY SYNCHRONIZATION

(71) Applicant: Samsung Electronics Co., Ltd., Suwon-si (KR)

(72) Inventors: Shiyang Leng, Allen, TX (US); Jeongho Jeon, San Jose, CA (US); Qiaoyang Ye, San Jose, CA (US); Joonyoung Cho, Portland, OR (US); Caleb K. Lo, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

This patent is subject to a terminal disclaimer.

(21) Appl. No.: 18/468,668

(22) Filed: Sep. 15, 2023

(65) Prior Publication Data

US 2024/0007982 A1  Jan. 4, 2024

Related U.S. Application Data

(63) Continuation of application No. 17/304,937, filed on Jun. 28, 2021, now Pat. No. 11,800,479.

(Continued)

(51) Int. Cl.
*H04W 56/00* (2009.01)
*H04B 7/01* (2006.01)
(Continued)

(52) U.S. Cl.
CPC ............ *H04W 56/005* (2013.01); *H04B 7/01* (2013.01); *H04W 74/0833* (2013.01); *H04W 84/06* (2013.01)

(58) Field of Classification Search
CPC ........... H04W 56/005; H04W 74/0833; H04W 84/06; H04W 56/0045; H04B 7/01; H04B 7/1851
See application file for complete search history.

(56) References Cited

U.S. PATENT DOCUMENTS 10,051,422 B1 *  8/2018  Kumar .................. H04W 4/023
10,554,293 B1    2/2020  Chin
(Continued)

FOREIGN PATENT DOCUMENTS

WO          2019195457 A1    10/2019

OTHER PUBLICATIONS

Panasonic, Timing advance and RACH aspect for NTN, Aug. 26-30, 2019, 3GPP TSG RAN WG1 #98, Prague, Czech Republic, 12 pages.*

(Continued)

*Primary Examiner* — Liem H. Nguyen
*Assistant Examiner* — Wilfred Thomas

(57) ABSTRACT

Methods and apparatuses for uplink timing and frequency synchronization in a wireless communication system. A method for operating a user equipment (UE) includes receiving, from a base station (BS), information indicating satellite ephemeris information of a communication satellite associated with the BS, a common timing advance (TA), and a compensated frequency offset (FO). The method further includes transmitting a physical random access channel (PRACH) based on the common TA and the compensated FO and receiving a random access response (RAR) indicating a UE-specific TA and FO. The method further includes, for transmission of an uplink (UL) channel, adjusting a TA and pre-compensating a FO based on the UE-specific TA and FO, respectively.

12 Claims, 17 Drawing Sheets

Related U.S. Application Data

(60) Provisional application No. 63/088,730, filed on Oct. 7, 2020, provisional application No. 63/062,800, filed on Aug. 7, 2020.

(51) Int. Cl.
*H04W 74/0833* (2024.01)
*H04W 84/06* (2009.01)

(56) References Cited

U.S. PATENT DOCUMENTS

| | | | |
|---|---|---|---|
| 11,792,758 B2* | 10/2023 | Ren | H04B 17/104 370/503 |
| 2002/0177450 A1 | 11/2002 | Vayanos | |
| 2004/0263386 A1* | 12/2004 | King | G01S 19/34 342/357.59 |
| 2016/0278033 A1 | 9/2016 | Wu | |
| 2018/0118377 A1 | 5/2018 | Garber | |
| 2019/0313357 A1 | 10/2019 | Wang | |
| 2019/0342000 A1* | 11/2019 | Zheng | H04B 7/18517 |
| 2019/0394770 A1 | 12/2019 | Wang | |
| 2020/0196263 A1 | 6/2020 | Heyn | |
| 2020/0354089 A1 | 11/2020 | Yakimenko | |
| 2021/0048537 A1* | 2/2021 | Marmet | G01S 19/243 |
| 2021/0083917 A1* | 3/2021 | Konishi | H04L 27/2675 |
| 2021/0212124 A1* | 7/2021 | Wakabayashi | G01S 19/25 |
| 2021/0352606 A1* | 11/2021 | Hosseinian | H04W 56/006 |
| 2021/0399797 A1* | 12/2021 | Khan | H04W 36/085 |
| 2022/0120840 A1 | 4/2022 | Liberg | |
| 2022/0150818 A1 | 5/2022 | Liberg | |
| 2022/0225421 A1 | 7/2022 | Miao | |
| 2022/0345961 A1 | 10/2022 | Tao | |
| 2023/0022834 A1* | 1/2023 | Wu | H04W 4/40 |
| 2023/0056527 A1* | 2/2023 | Medles | H04W 56/009 |
| 2023/0239043 A1* | 7/2023 | Xu | H04B 7/18547 455/427 |
| 2023/0262632 A1* | 8/2023 | Liu | H04W 72/23 370/503 |
| 2023/0300767 A1* | 9/2023 | Jiang | H04W 56/0045 370/329 |
| 2024/0098796 A1* | 3/2024 | Miao | H04L 27/26025 |

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Multiplexing and channel coding (3GPP TS 38.212 version 15.8.0 Release 15)", ETSI TS 138 212 V15.8.0, Jan. 2020, 106 pages.

"5G; NR; Physical channelsand modulation (3GPP TS 38.211 version 15.8.0 Release 15)", ETSI TS 138 211 V15.8.0, Jan. 2020, 100 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

International Search Report and Written Opinion dated Nov. 15, 2021 regarding International Application No. PCT/KR2021/010446, 8 pages.

Ericsson, "On NTN synchronization, random access, and timing advance", 3GPP TSG-RAN WG1 Meeting #99, R1-1912725, Nov. 2019, 22 pages.

Panasonic, "Timing advance and PRACH design for NTN", 3GPP TSG RAN WG1 #99, R1-1912903, Nov. 2019, 13 pages.

Nokia et al., "Considerations on Doppler Compensation, Uplink Timing Advance and Random Access in NTN", 3GPP TSG RAN WG1 Meeting #98, R1-1908250, Aug. 2019, 21 pages.

Extended European Search Report issued Dec. 20, 2023 regarding Application No. 21853781.9, 13 pages.

Huawei et al., "Discussion on Doppler compensation, timing advance and RACH for NTN", 3GPP TSG RAN WG1 Meeting #98, R1-1908049, Aug. 2019, 36 pages.

ZTE, "Summary of 7.2.5.3 on UL timing and PRACH", 3GPP TSG RAN WG1 #97, R1-1907750, May 2019, 12 pages.

CATT, "PRACH design and UL timing management", 3GPP TSG RAN WG1 Meeting #98bis, R1-1910338, Oct. 2019, 10 pages.

* cited by examiner

UPLINK TIMING AND FREQUENCY SYNCHRONIZATION

CROSS-REFERENCE TO RELATED APPLICATIONS AND CLAIM OF PRIORITY

This application is a continuation of U.S. patent application Ser. No. 17/304,937, filed on Jun. 28, 20201, which claims priority to U.S. Provisional Patent Application No. 63/062,800, filed on Aug. 7, 2020 and U.S. Provisional Patent Application No. 63/088,730, filed on Oct. 7, 2020. The contents of the above-identified patent documents are incorporated herein by reference.

TECHNICAL FIELD

The present disclosure relates generally to wireless communication systems and, more specifically, the present disclosure relates to uplink timing and frequency synchronization.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to uplink timing and frequency synchronization.

In one embodiment, a user equipment (UE) is provided. The UE includes a transceiver configured to receive, from a base station (BS), information indicating satellite ephemeris information of a communication satellite associated with the BS, a common timing advance (TA), and a compensated frequency offset (FO); transmit a physical random access channel (PRACH) based on the common TA and the compensated FO. and receive a random access response (RAR) indicating a UE-specific TA and FO. The UE also includes a processor operably connected to the transceiver. The processor is configured to, for transmission of an uplink (UL) channel, adjust a TA and pre-compensate a FO based on the UE-specific TA and FO, respectively.

In another embodiment, a BS is provided. The BS includes a processor configured to identify satellite ephemeris information of a communication satellite associated with the BS, a common TA, and a compensated FO. The BS also includes a transceiver operably connected to the processor. The transceiver is configured to transmit information indicating the satellite ephemeris information, the common TA, and the compensated FO; and receive, from a UE, a PRACH. The processor is further configured to determine a TA and a FO for the UE based on the received PRACH. The transceiver is further configured to transmit a RAR indicating the determined TA and FO.

In yet another embodiment, a method for operating a UE is provided. The method includes receiving, from a BS, information indicating satellite ephemeris information of a communication satellite associated with the BS, a common TA, and a compensated FO. The method further includes transmitting a PRACH based on the common TA and the compensated FO and receiving a RAR indicating a UE-specific TA and FO. The method further includes, for transmission of an UL channel, adjusting a TA and pre-compensating a FO based on the UE-specific TA and FO, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP, TR 38.811 v15.2.0, "Study on NR to support non-terrestrial networks"; 3GPP, TR 38.821 v16.0.0, "Solutions for NR to support non-terrestrial networks (NTN)"; 3GPP, TS 38.212 v15.8.0, "5G; NR; Multiplexing and channel coding"; 3GPP, TS 38.211 v15.8.0, "5G; NR; Physical channels and modulation"; 3GPP TS 38.321 v16.2.0, "NR; Medium Access Control (MAC) protocol specification"; and 3GPP TS 38.331 v16.2.0, "NR; Radio Resource Control (RRC) Protocol Specification."

Figure 1:
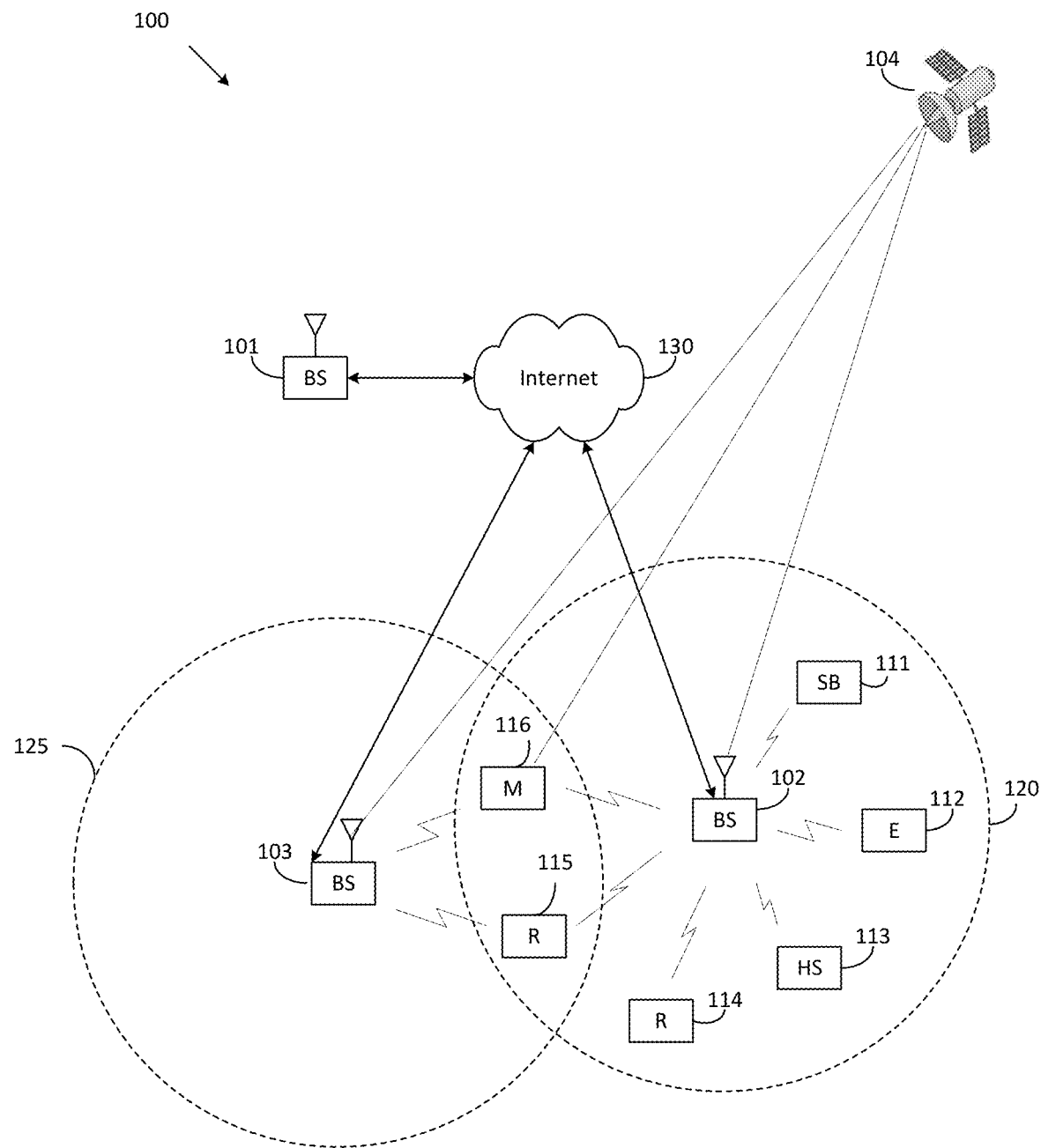
FIG. 1 illustrates an example wireless network according to embodiments of the present disclosure.
Figure 2:
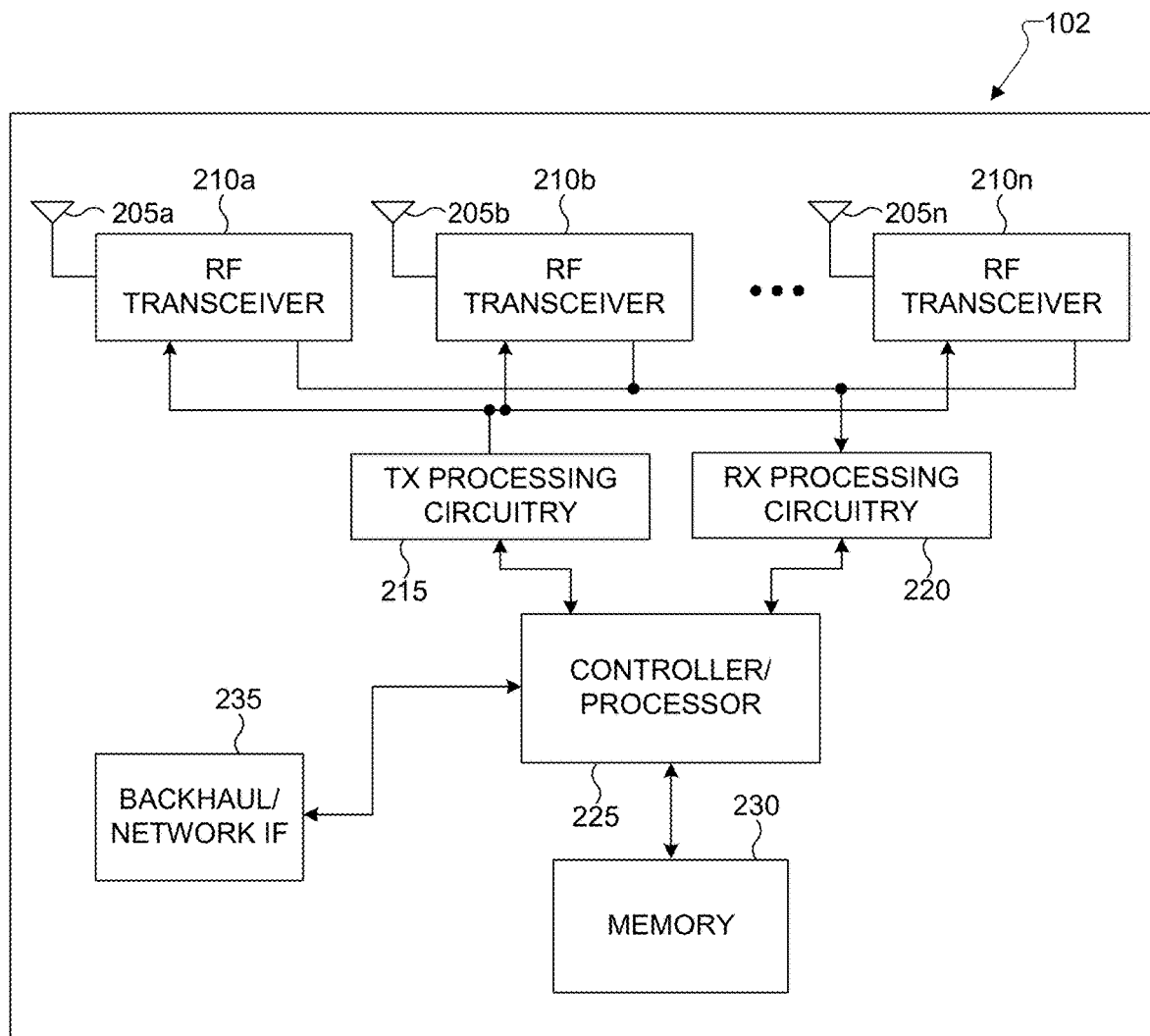
FIG. 2 illustrates an example gNB according to embodiments of the present disclosure.
Figure 3:
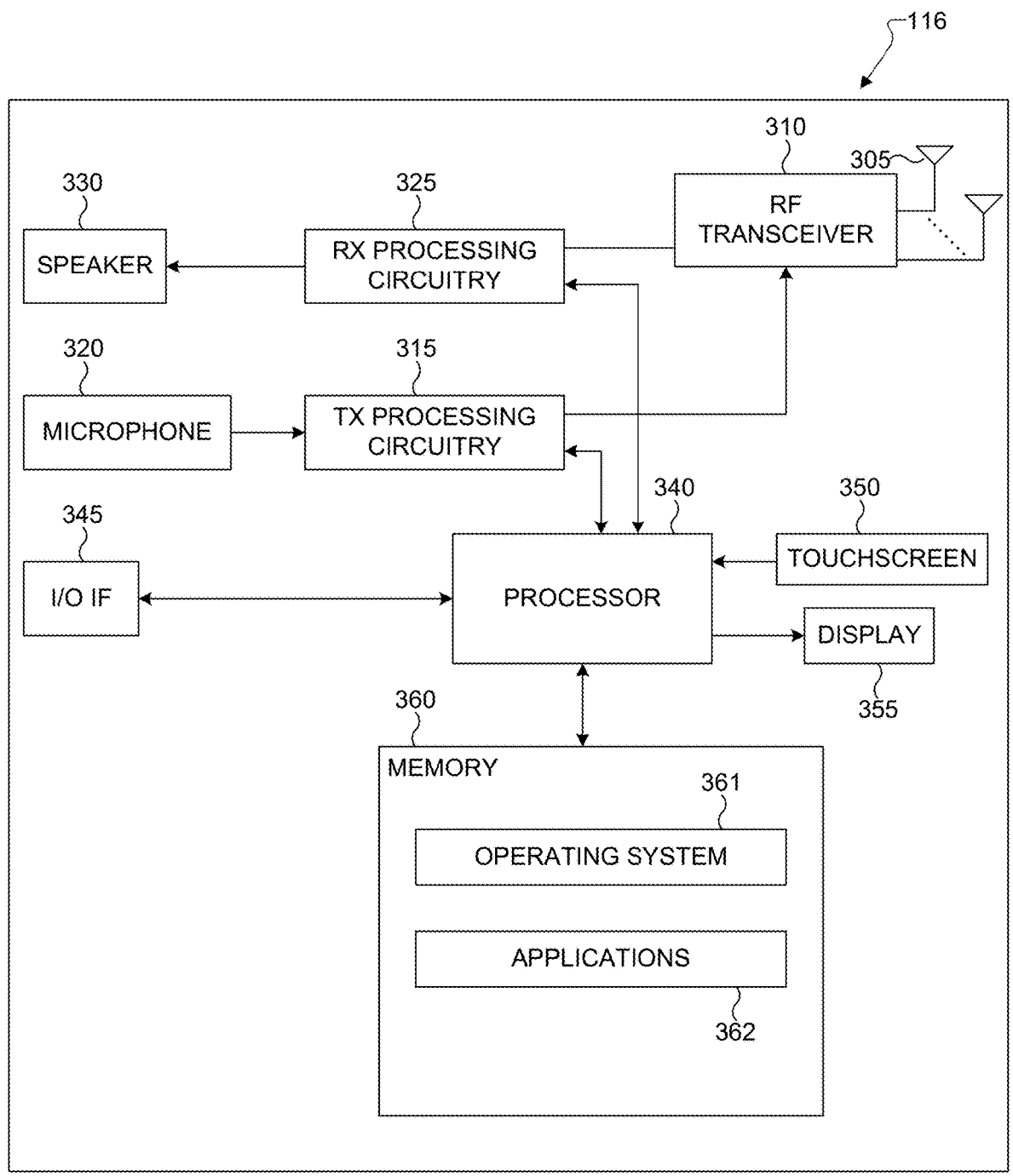
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "gNB" can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof. In certain embodiments, and one or more of the gNBs 101-103 includes circuitry, programing, or a combination thereof for uplink timing and frequency synchronization.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNB s over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could provide support for uplink timing and frequency synchronization in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for uplink timing and frequency synchronization in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
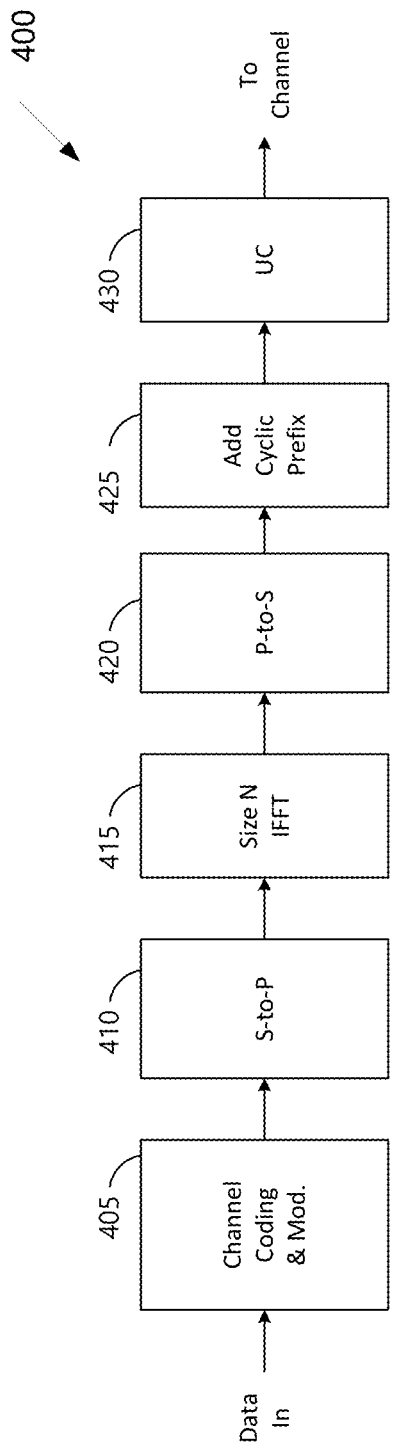
FIGS. 4 and 5 illustrate example wireless transmit and receive paths according to this disclosure.
Figure 5:
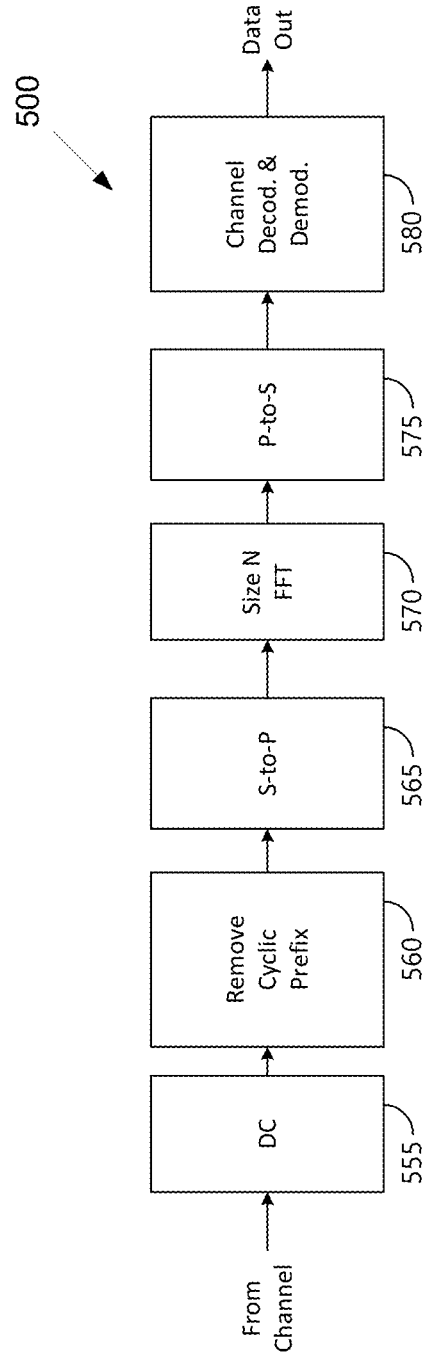

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

An non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

In conventional terrestrial networks, TA mechanism is implemented to synchronize the BS receptions of UL transmissions in the same cell. The BS sends TAC to UEs to adjust the UL transmission timing. In systems such as an NTN, due to the long propagation delay and the large cell coverage, the existing TA range in TAC cannot support the large TA that needs to be adjusted for UL transmission in satellite communication. For satellites moving fast relative to UE, such as LEO and MEO satellites, the TA has to be adjusted more frequently than conventional terrestrial networks due to the time varying propagation delay. Thus, methods for the UL timing synchronization may be considered taking into account the long propagation delay and large cell coverage.

In addition, the UL transmissions in the same cell may be frequency-aligned to maintain the frequency orthogonality at the BS. In systems such as NTN, due to the large cell coverage and high Doppler in low earth orbit (LEO) or medium earth orbit (MEO) satellite communication systems, UEs at different positions in the same cell experience significantly divergent (residual) Doppler shifts. The UL signals can be transmitted and received misaligned at frequencies with large offsets. Thus, methods for UL frequency synchronization may be considered taking into account the large cell coverage and high Doppler shifts.

In the present disclosure, embodiments relate to electronic devices and methods on UL TA and frequency synchronization for systems with large propagation delay, and/or large cell coverage, and/or high Doppler shifts. The systems with a long propagation delay, and/or large cell coverage, and/or high Doppler, such as an NTN, is required to support a large TA range and/or more frequent TACs. The method that ensures the UL timing synchronization may be designed. In addition, the high Doppler and large cell coverage lead to large frequency offsets for UL transmissions and/or receptions among different UEs. The methods that ensure the UL frequency synchronization may be designed.

In the present disclosure, techniques, apparatus, and methods are disclosed for UL timing and frequency synchronization, that support scenarios with long propagation delay, and/or large cell coverage, and/or high Doppler. UEs are able to adjust TA and correct frequency offsets for UL transmissions based on the BS indication of satellite ephemeris information and configuration information related to TA and/or frequency offsets.

Figure 6:
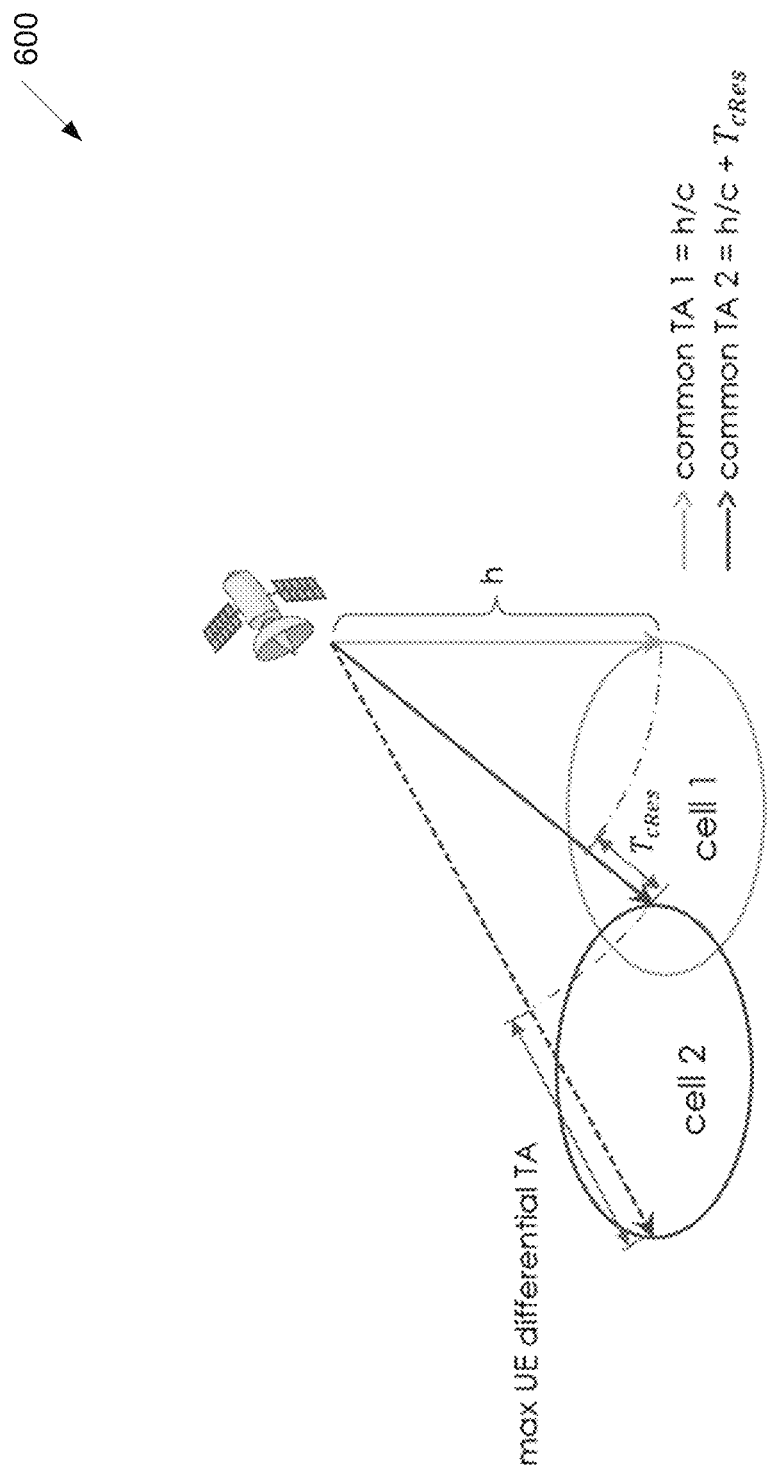
FIG. 6 illustrates an example common TA and residual common TA according to embodiments of the present disclosure.

FIG. 6 illustrates an example common TA and residual common TA 600 according to embodiments of the present disclosure. An embodiment of the common TA and residual common TA 600 shown in FIG. 6 is for illustration only.

A minimum common TA can be calculated as $T_{c0}=h/c$, where h is the satellite altitude (e.g., of communication satellite(s) 104) and c is the speed of light, as in the case of cell 1. For the general cases, the common TA is the sum of the minimum common TA and a residual common TA, as in the case of cell 2. Depending on a UE's location in the cell, the UE-specific TA is the sum of the common TA and the UE-differential TA.

In one embodiment, UL timing and frequency synchronization in initial access are provided. In an initial access, a BS transmits information that enables the UE to adjust TA and compensate frequency offset for UL transmissions in random access procedure.

Figure 7:
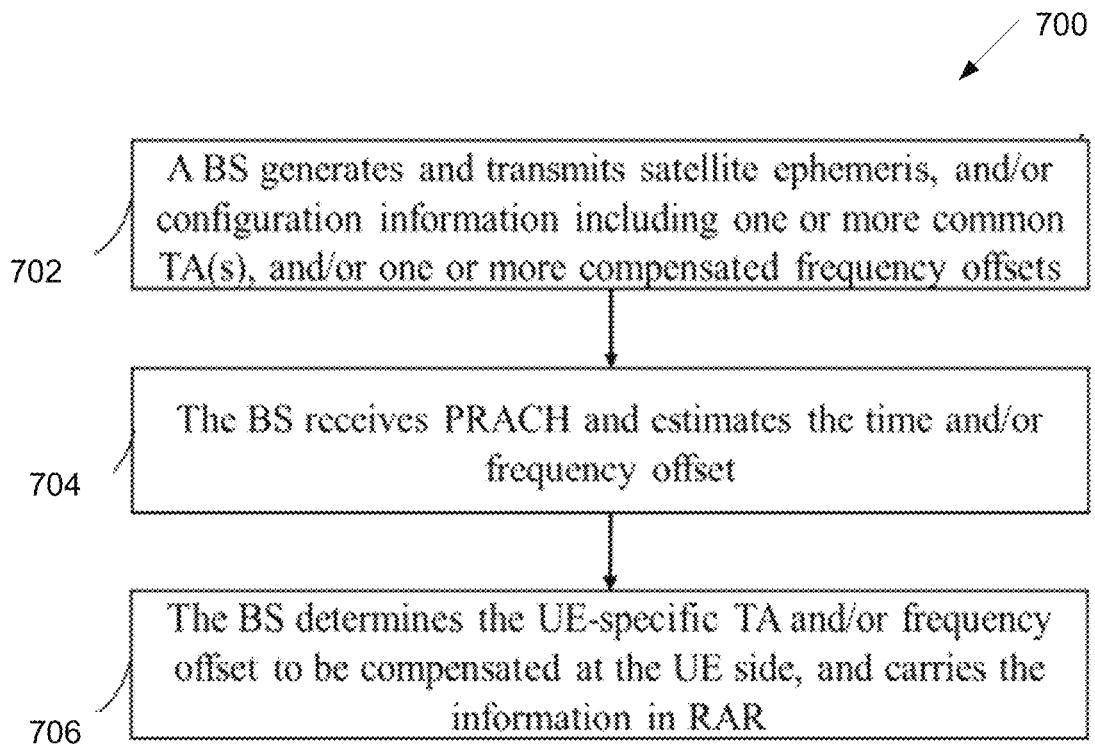
FIG. 7 illustrates a flowchart of a method of BS operation in an initial access according to embodiments of the present disclosure.

FIG. 7 illustrates a flowchart of a method 700 of BS operation in an initial access according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. For example, the method 700 may be performed by the base station 102.

As illustrated in FIG. 7, at operation 702, a BS generates and transmits satellite ephemeris, and/or configuration information including one or more common TA(s), and/or one or more compensated frequency offset values. The common TA takes into account the cell-specific service link delay and the feeder link delay if presented. At operation 704, the BS receives PRACH and estimates the time and/or frequency offset. At operation 706, the BS determines the UE-specific TA and/or frequency offset to be compensated at the UE side, and carries the information in RAR.

Figure 8:
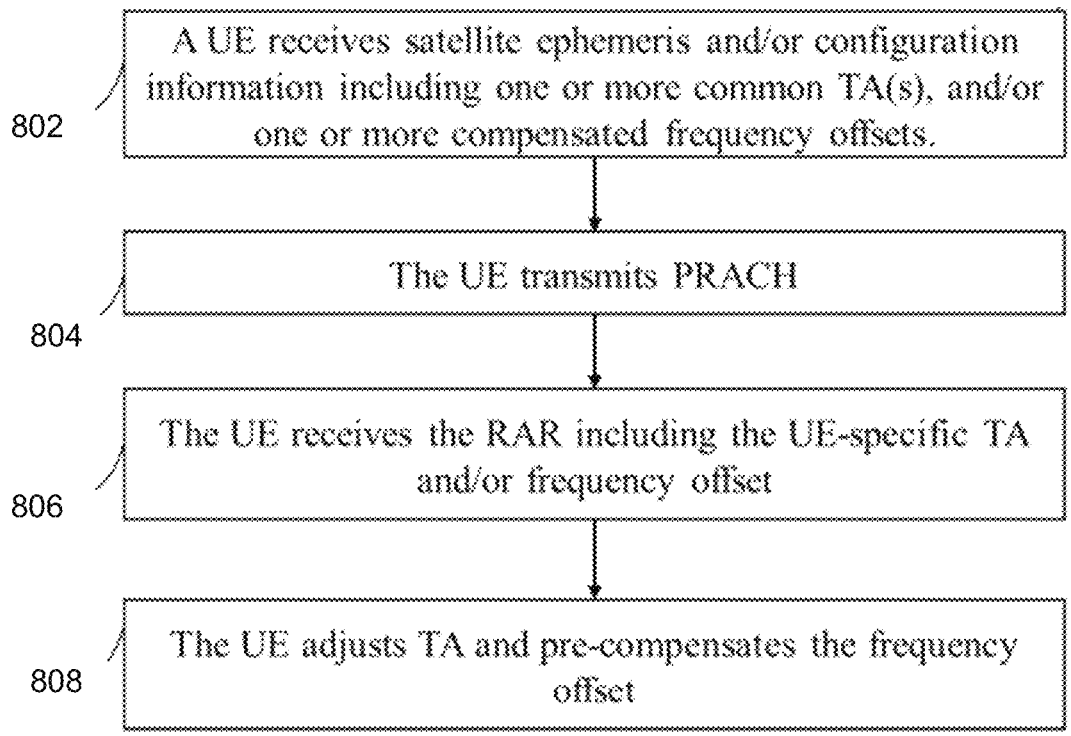
FIG. 8 illustrates a flowchart of a method of UE operation in an initial access according to embodiments of the present disclosure.

FIG. 8 illustrates a flowchart of a method 800 of UE operation in an initial access according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. For example, the method 800 may be performed by the UE 116.

As illustrated in FIGURE, at operation 802, a UE receives satellite ephemeris and/or configuration information including one or more common TA(s), and/or one or more compensated frequency offset values. At operation 804, the UE transmits PRACH. At operation 806, the UE receives the RAR including the UE-specific TA and/or frequency offset. At operation 808, the UE adjusts TA and pre-compensates the frequency offset. In one embodiment, an indication of satellite ephemeris information is provided.

As illustrated in 702 and 802 in FIGS. 7 and 8, the satellite ephemeris indication can include the satellite coordinate and velocity at a reference time. A table for the satellite altitude levels can be predefined, as shown in TABLE 1 for an example. In one example, the satellite altitude h can be determined by $h=h_t+s_i \cdot h_{offset}$, where i is the satellite index indicated by the BS, i=0, 1, ..., $N_{maxIndex}$ with $N_{maxIndex}$ being a predefined integer such as 30 in the example of TABLE 1. $h_i$ is the altitude level, $s_i$ is the scalar corresponding to satellite index i specified by the predefined table, and $h_{offset}$ is the altitude offset indicated by the BS.

TABLE 1

An example of predefined table for satellite altitude levels

| Satellite type | Index i | Altitude level $h_i$ (km) | Altitude scalar $s_i$ |
|---|---|---|---|
| LEO 300-1500 km | 0 | 300 | s0 |
| | 1 | 400 | s1 |
| | 2 | 500 | s2 |
| | . | . | . |
| | . | . | . |
| | . | . | . |
| | 10 | 1300 | s10 |
| | 11 | 1400 | s11 |
| MEO 7000-25000 km | 12 | 7000 | s12 |
| | 13 | 8000 | s13 |
| | 14 | 9000 | s14 |
| | . | . | . |
| | . | . | . |
| | . | . | . |
| | 28 | 23000 | s28 |
| | 29 | 24000 | s29 |
| GEO | 30 | 35786 | s30 |

The satellite ephemeris information can be indicated in system information, e.g., MIB, SIB1, other SIBs and/or a new SIB. An example of using SIB1 is given in TABLE 2, where the IE servingCellConfigCommonSIB in SIB1 is modified. In this example, the satellite ephemeris information includes the altitude offset, $h_{offset}$, which is indicated by the index values of N h=1, ..., $N_{maxAltdStep}$ such that $h_{offset}=N_h \cdot \Delta_h$, where $\Delta h$ is a step size that can be predefined or can be implicitly indicated by a predefined mapping between $\Delta_h$ and the satellite indices.

TABLE 2

An example of IE ServingCellConfigCommonSIB modification for indication of satellite ephemeris

```
ServingCellConfigCommonSIB ::=    SEQUENCE {
   downlinkConfigCommon      DownlinkConfigCommonSIB,
   uplinkConfigCommon        UplinkConfigCommonSIB OPTIONAL,-- Need R
   ...
   ephemeris                 SEQUENCE{
      satelliteIndex              INTEGER (0..N_maxIndex),
      altitudeOffset              INTEGER (0..N_maxAltaStep),
      coordX                      INTEGER (0..N_maxCoordStep),
      coordY                      INTEGER (0..N_maxCoordStep),
      coordZ                      INTEGER (0..N_maxCoordStep),
      velocityX                   INTEGER (0..N_maxVelStep),
      velocityY                   INTEGER (0..N_maxVelStep),
      velocityZ                   INTEGER (0..N_maxVelStep),
      refTime_SNF                 INTEGER (0..N_maxRefTimeStep1)
      refTime_slot                INTEGER (0..N_maxRefTimeStep2)
   },                                   OPTIONAL,   -- Need R
   ...
```

In one example, the satellite ephemeris information can include the coordinate (X, Y, Z). The values of X, Y, Z can be indicated by the parameters coordX, coordY, and coordZ, respectively, which can be indicated by cell-specific signaling, such as MIB, SIB1 or other SIBs. TABLE 2 provides an example of indicating the parameters coordX, coordY, and coordZ in SIB1, which can be any integer between 0 and $N_{maxCoordStep}$, i.e., coordX, coordY, coordZ=1, ..., $N_{maxCoordStep}$.

The coordinate can be determined by (X, Y, Z)=(coordX, coordY, coordZ)·$\Delta_c$, where $\Delta_c$ is a step size and $N_{maxcoordstep}$ is a predefined integer. The step size $\Delta_c$ can be predefined or can be indicated. In the latter example where $\Delta_c$ is indicated, an implicit indication can be used, e.g., a mapping between $\Delta_c$ and satellite altitude can be predefined. For instance, for the earth centered earth fixed (ECEF) coordinate, $\Delta_c$ can be $(R+h)/N_{maxcoordstep}$, and the coordinate can be given by (X, Y, Z)=(R+h)·(coordX, coordY, coordZ)/$N_{maxcoordstep}$, where R is the radius of earth.

In one example, the satellite ephemeris information can include the velocity (VX, VY, VZ). The values of VX, VY, VZ can be indicated by the parameters velocityX, velocityY, and velocityZ, respectively, which can be indicated by cell-specific signaling, such as MIB, SIB 1 or other SIBs. TABLE 2 provides an example of the indication of parameters velocityX, velocityY, and velocityZ in SIB1, which can be any integer between 0 and $N_{maxVelStep}$, i.e., velocityX, velocityY, velocityZ=0, 1, ..., $N_{maxVelStep}$.

The velocity can be determined by (VX, VY, VZ)= (velocityX, velocityY, velocityZ) $\Delta_v$, where $\Delta_v$ is a step size and $N_{maxVelStep}$ is a predefined integer. The step size $\Delta_v$ can be predefined or can be indicated. In the latter example where $\Delta_v$ is indicated, an implicit indication can be used, e.g., a mapping between $\Delta_v$ and satellite altitude can be predefined. For instance, $\Delta_v$ can be $$\sqrt{\frac{GM_E}{(R+h)}}/N_{maxVelStep},$$

and the velocity can be determined based on the satellite altitude, which is given by $$(VX, VY, VZ) = \sqrt{\frac{GM_E}{(R+h)}}.$$

(velocityX, velocityY, velocityZ)/$N_{maxVelStep}$, where G is the gravity constant, and $M_E$ is the mass of earth.

In one example, the satellite ephemeris information can include the reference time $T_{ref}$ corresponding to the indicated coordinate and velocity. The reference time $T_{ref}$ can be indicated by the index values of refTime=0, 1, . . . , $N_{maxRefTimeStep}$, such that $T_{ref}$=refTime·$\Delta_T$, where $\Delta_T$ is a predefined step size and $N_{maxRefTimeStep}$ is a predefined integer.

The reference time can be indicated by the system frame number and/or the slot index, where $N_{maxRefTimeStep}$ is the maximum frame number or the maximum slot index, and $\Delta_T$=1. TABLE 2 provides an example of indicating the system frame number and the slot index by parameters refTime_SNF and refTime_slot, respectively, where refTime_SNF=0, 1, . . . , $N_{maxRefTimeStep1}$ and refTime_slot=0, 1, . . . , $N_{maxRefTimeStep2}$. $N_{maxRefTimeStep1}$ and $N_{maxRefTimeStep2}$ are predefined integers. Alternatively, the reference time can be indicated by the absolute time, e.g., in terms of the date, month, year and/or the time. In one example, the reference time can be indicated by refTime·$_T$ with $\Delta_T$=1 ms and $N_{maxRefTimeStep}$ being a predefined maximum update period for the satellite ephemeris information.

In one embodiment, an indication of common TA and compensated frequency offset(s) is provided.

In one embodiment of operation 702 and 802 as illustrated in FIGS. 7 and 8, the common TA can be indicated based on the satellite altitude. Specifically, the common TA, $T_c$, can be divided into the minimum common TA, $T_{c0}$, and a residual common TA, $T_{cRes}$. The minimum common TA can be calculated as $T_{c0}$=h/c, where h is the satellite altitude and c is the speed of light. The residual common TA $T_{cRes}$ can be indicated in system information, e.g., MIB, SIB1, other SIBs and/or a new SIB.

The common TA can be determined by $$T_c = s \cdot \frac{h}{c} + T_{cRes},$$

where s is a scalar. In one example the scalar s can be predefined. Alternatively, s can be indicated by the BS in system information, e.g., MIB, SIB1, other SIBs and/or a new SIB. For instance, s can be indicated to be 1, which can be applied to cases if only service link is considered. In some other cases, s can be indicated to be 2 or a larger value, which can be applied to scenarios where both service link and feeder link are considered. An example of using SIB1 to indicate the residual common TA $T_{cRes}$ and the scalar of the common TA s is given in TABLE 3, where the IE servingCellConfigCommonSIB in SIB1 is modified.

The residual common TA is indicated by the index value $N_{cRes}$=0, 1, . . . , $N_{maxResTAStep}$, $T_{cRes}$=$N_{cRes}$·$\Delta_{cRes}$, where $\Delta_{cRes}$ is a predefined step size for the residual common TA and $N_{maxResTAStep}$ is a predefined integer. The scalar s is indicated as an integer between 1 and $N_{maxScalar}$, i.e., s=0, 1, . . . , $N_{maxScalar}$, where $N_{maxScalar}$ is a predefined integer.

The compensated frequency offset at the BS can be indicated in system information, e.g., MIB, SIB1, other SIB s and/or a new SIB. The frequency offset can denote the pre-compensated Doppler value of DL transmissions at the BS, and/or the post-compensated Doppler value of UL transmissions at the BS. In case of multiple frequency offsets compensated at the BS, one method that enables UE to identify the amount of frequency offset compensated at BS is to associate the values of the compensated frequency offsets with system synchronization block (SSB) indices.

After decoding the SSB index carried in PBCH, the UE can identify the compensated frequency offset value based on an SSB index of the UE. An example of using SIB1 to indicate the compensated frequency offsets is given in TABLE 3, where the IE servingCellConfigCommonSIB in SIB1 is modified. For example, the value of the frequency offset compensated for a set of SSBs, $FO_{comp}$, is indicated by the parameter FO, and the corresponding SSB indices associated to the indicated frequency offset are indicated in the field "SSBbitmap."

An example of indicating two frequency offset values is given in TABLE 3. For each frequency offset value $FO_{comp}$, a bitmap is transmitted in the field SSBbitmap. The kth bit in the bitmap setting to 1 indicates that SSB k is compensated by the frequency offset $FO_{comp}$, and L_max is the number of SSBs. The value of frequency offset $FO_{comp}$ is indicated by the index values of FO=0, 1, . . . , $N_{maxFostep}$, such that $FO_{comp}$=FO·$\Delta_{FO}$, where $\Delta_{FO}$ is a step size and $N_{maxFostep}$ is a predefined integer.

The step size 40 can be predefined or can be indicated. In the latter example, $\Delta_{FO}$ can be implicitly indicated based on the satellite altitude. For instance, the maximum value of $FO_{comp}$ can be the largest Doppler shift, $f_c$v/c, where $f_c$ is the carrier frequency, c is the speed of light, and v is the speed of the satellite, i.e., $$v = \sqrt{\frac{GM_E}{(R+h)}}.$$

The step size $\Delta_{FO}$ can be $f_c$v/c/$N_{maxFostep}$ in this case, which can be implicitly indicated by the satellite altitude.

TABLE 3

An example of IE ServingCellConfigCommonSIB modification for indication of TA and compensated frequency offsets

| | |
|---|---|
| ServingCellConfigCommonSIB ::= | SEQUENCE { |
| downlinkConfigCommon | DownlinkConfigCommonSIB, |
| uplinkConfigCommon | UplinkConfigCommonSIB OPTIONAL,--Need R |
| ... | |
| residualCommonTA | NTEGER (0..$N_{maxResTAStep}$)OPTIONAL,-- Need R |
| scalarCommonTA | INTEGER (1..$N_{maxscalar}$)OPTIONAL, -- Need R |
| compFO1 | SEQUENCE { |
|     SSBbitmap | BIT STRING (SIZE (L_max)), |
|     FO | INTEGER (0..$N_{maxFOStep}$) |
| }, | OPTIONAL, -- Need R |
| compFO2 | SEQUENCE { |
|     SSBbitmap | BIT STRING (SIZE (L_max)), |
|     FO | INTEGER (0..$N_{maxFOStep}$) |
| }, | OPTIONAL, -- Need R |
| ... | |
| } | |

In one embodiment, an indication of TA and frequency offset in RAR is provided.

In an example for operation 706 as illustrated in FIG. 7, one method to support a larger TA range is to extend the size of TAC field in RAR to include additional bits. The size of the TAC field in RAR can be extended from 12 bits to 12+N bits, by adding N bits to extend the TA range.

Figure 9:
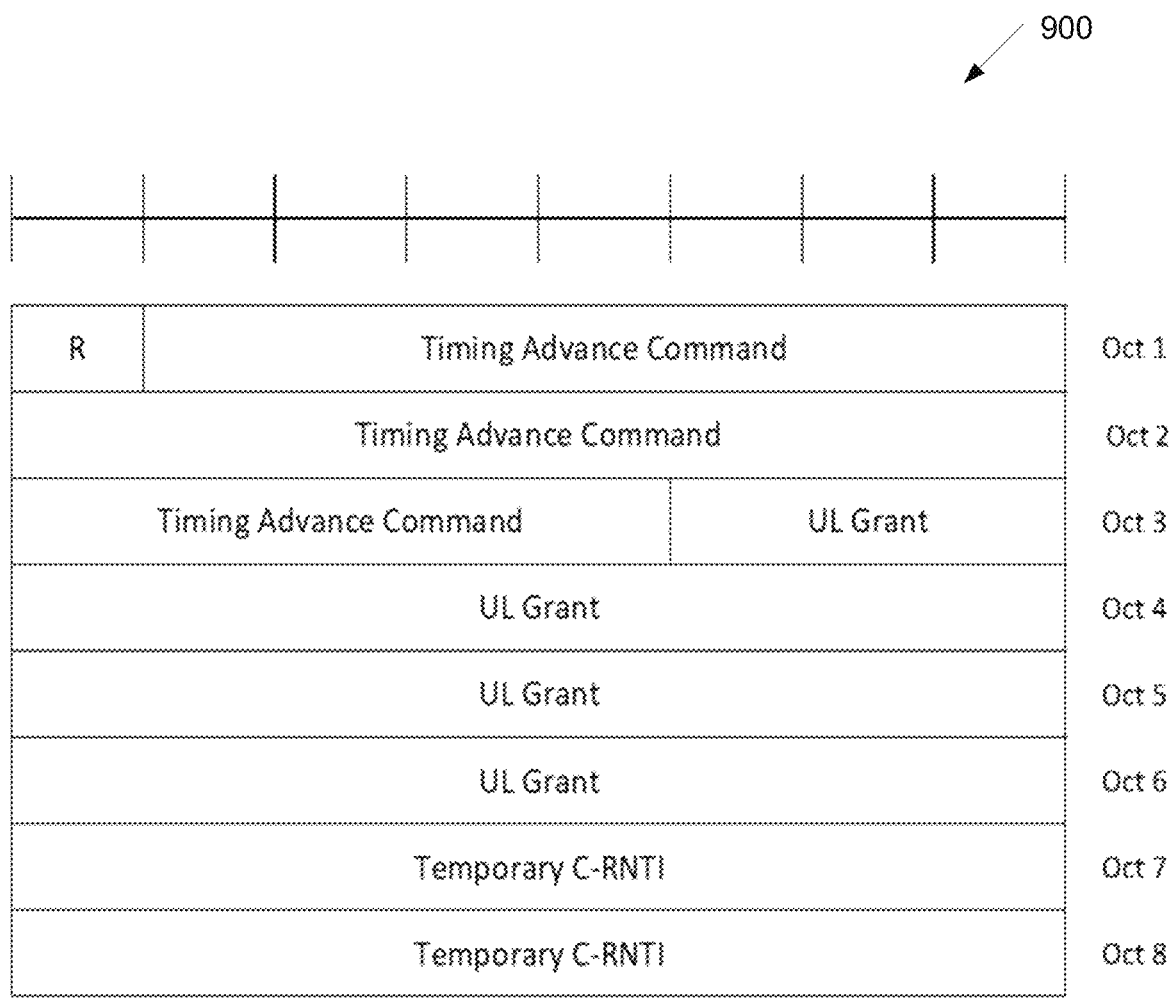
FIG. 9 illustrates an example extending of the size of TA command (TAC) in a RAR according to embodiments of the present disclosure.

FIG. 9 illustrates an example extending of the size of TAC in RAR 900 according to embodiments of the present disclosure. An embodiment of the extending of the size of TAC in RAR 900 shown in FIG. 9 is for illustration only.

FIG. 9 illustrates the example of extending 8 bits, i.e. adding an octet, for TAC in RAR. In one example, both positive and negative TA values can be supported, and one of the extended bit can be used to indicate the sign of the TA value. In another example, the reserved bit in MAC RAR and/or the bit for CSI request in UL grant field in RAR can be used to extend the TA range or be used to indicate the sign of the TA value in examples where both positive and negative TA values are supported.

Alternatively, the TA step size can be scaled to support a larger TA range. One example is to increase the current TA step size by M times, where M is a predefined value that ensures the TA granularity is no larger than the cyclic prefix (CP) length. Another example to accommodate different UE-specific TA values is to use two different cell-specific scaling factors, which can be predefined, or be configured. In one example, the two scaling factors can be implicitly indicated, e.g., based on the satellite altitude, or be explicitly indicated, e.g., by the BS in system information, e.g., MIB, SIB1, other SIB s and/or a new SIB.

TABLE 4 illustrates an example of explicitly indicating scalars in the IE servingCellConfigCommonSIB in SIB 1. The reserved bit in MAC RAR can be used to indicate which one of the two scalars is used for the TAC. In the example that both positive and negative TA values are supported, the bit for CSI request in UL grant field in RAR can be used to indicate the sign of the TA value. Alternatively, the CSI request bit in UL grant in RAR can be used to indicate which one of the two scaling factors to be used for the TAC, and/or the reserved bit in RAR can be used to indicate the sign of the TA value.

TABLE 4

An example of IE ServingCellConfigCommonSIB modification for indicating of scaling factors for RAR TAC

```
ServingCellConfigCommonSIB ::=     SEQUENCE {
    downlinkConfigCommon    DownlinkConfigCommonSIB,
    uplinkConfigCommon      UplinkConfigCommonSIB OPTIONAL,-- Need R
    ...
    scalar1RAR-TA           INTEGER (1..maxScalar)OPTIONAL,-- Need R
    scalar2RAR-TA           INTEGER (1..maxScalar)OPTIONAL,-- Need R
    ...
}
```

One another example regarding TA step size scaling is that scaling factors can be implicitly indicated, e.g., by associating with satellite indices or altitude levels. The UE receives the indication of the satellite index and can identify the corresponding scaling factor(s) used in the TAC.

TABLE 5 illustrates an example of TA scaling factors associated with satellite indices, or equivalently the altitude levels. In one example, there can be two scaling factors for TA step size, where one factor is associated with satellite index or altitude level e.g., as illustrated by TABLE 5, while the other scaling factor can be predefined, e.g., to be 1.

TABLE 5

An example of predefined table for TA scaling factors

| Satellite type | Index i | Altitude level $h_i$ (km) | TA scaling factor for SCS | | | |
|---|---|---|---|---|---|---|
| | | | $\mu = 0$ | $\mu = 1$ | $\mu = 2$ | $\mu = 3.4$ |
| LEO 300-1500 km | 0 | 300 | 2 | 4 | 7 | 9 |
| | 1 | 400 | | | | |
| | 2 | 500 | | | | |
| | . | . | | | | |
| | . | . | | | | |
| | . | . | | | | |
| | 10 | 1300 | | | | |
| | 11 | 1400 | | | | |
| MEO 7000-25000 km | 12 | 7000 | 2 | 4 | 8 | 9 |
| | 13 | 8000 | | | | |
| | 14 | 9000 | | | | |
| | . | . | | | | |
| | . | . | | | | |
| | 28 | 23000 | | | | |
| | 29 | 24000 | | | | |
| GEO | 30 | 35786 | 6 | | 9 | |

In one embodiment of operation 706 as illustrated in FIG. 7, to indicate the frequency offset to be compensated at the UE, additional n bits can be extended for frequency offset indication in RAR TAC. For instance, one octet can be added including one bit indicating the sign of the frequency offset in examples where both positive and negative frequency offsets are adopted.

Figure 10:
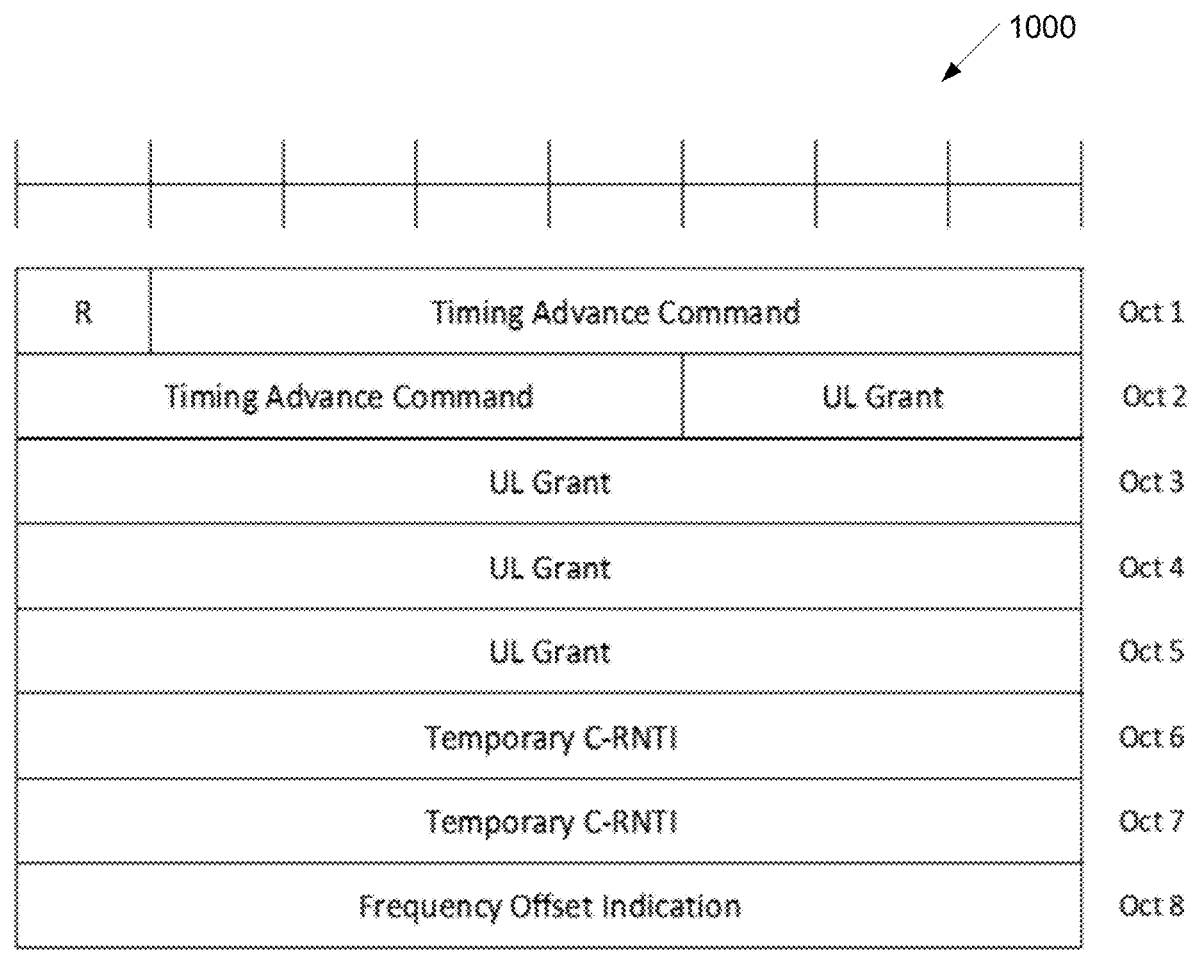
FIG. 10 illustrates an example field for frequency offset indication in RAR according to embodiments of the present disclosure.

FIG. 10 illustrates an example field for frequency offset indication in RAR 1000 according to embodiments of the present disclosure. An embodiment of the field for frequency offset indication in RAR 1000 shown in FIG. 10 is for illustration only.

Alternatively, a new field for frequency offset indication in RAR can be defined. FIG. 10 illustrates the example of defining a new field of frequency offset indication in RAR, where the size of the frequency offset indication field is 8 bits, i.e., an octet. In one example, both positive and negative frequency offsets are supported, and one bit in the new field can be used to indicate the sign of the frequency offset. In another example, the reserved bit in MAC RAR and/or the bit for CSI request in UL grant field in RAR can be used to indicate the frequency offset, or to indicate the sign of the frequency offset if both positive and negative values are adopted.

In the example of indicating TA and frequency offset by extending bits in MAC RAR, one or multiple octets can be added, where one or more of the extended bits are used to extend TA range, and one or more of the rest bits are for frequency offset indication. The reserved bit in MAC RAR and/or the bit for CSI request in UL grant field in RAR can be used to either extend TA range, or indicate the frequency offset, or indicate the sign of the TA/frequency offset if both positive and negative values are adopted. For extending the TA range, the example of extending bits and the various examples of scaling TA step size discussed above can be used jointly with flexible combinations.

Figure 11:
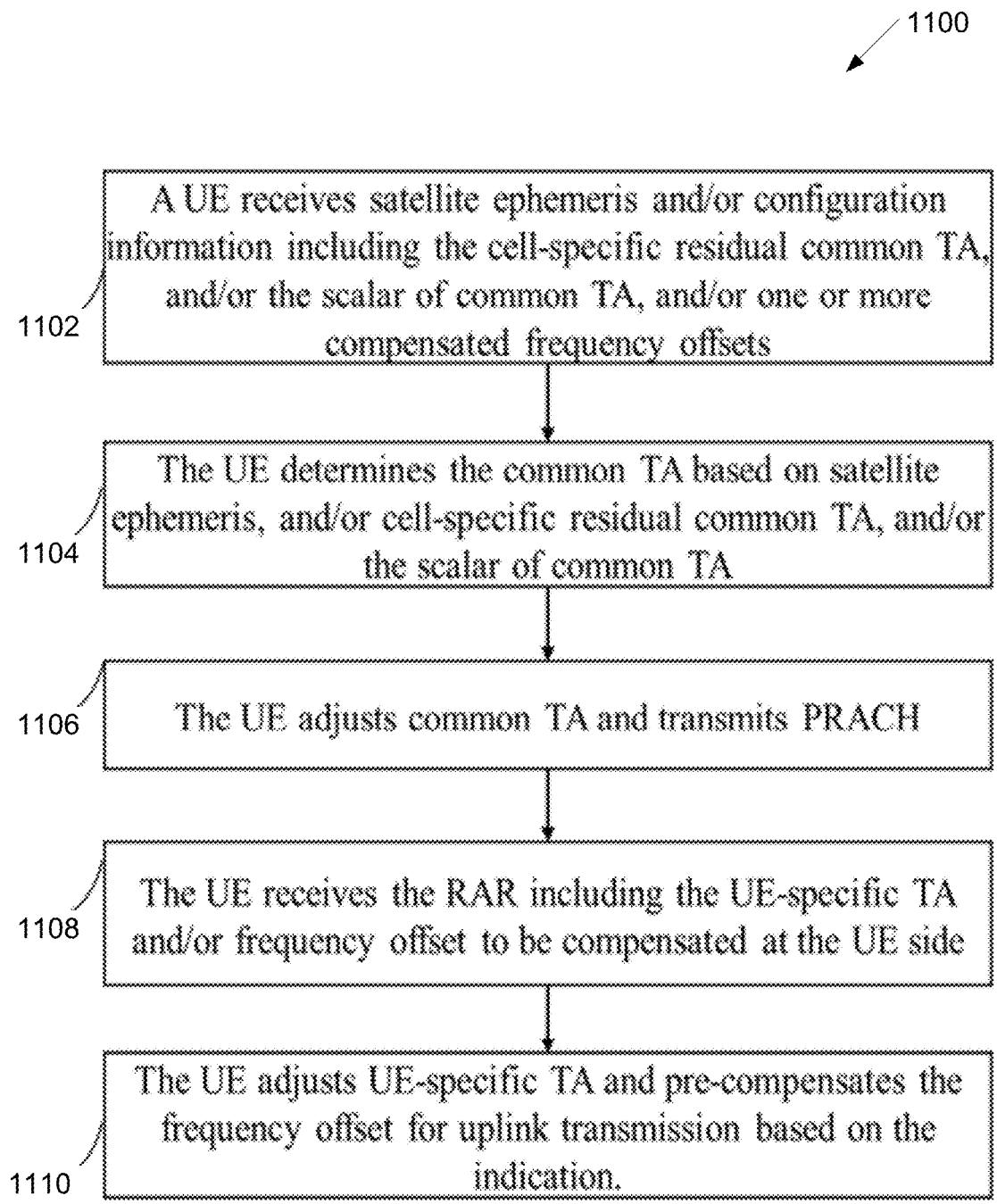
FIG. 11 illustrates a flowchart of a method for a global navigation satellite system (GNSS)-incapable UE in an initial access according to embodiments of the present disclosure.

FIG. 11 illustrates a flowchart of a method 1100 for GNSS-incapable UE in an initial access according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. For example, the method 1100 may be performed by the UE 116.

As illustrated in FIG. 11, at operation 1102, a UE receives satellite ephemeris and/or configuration information including the cell-specific residual common TA, and/or the scalar of common TA, and/or one or more compensated frequency offset values. At operation 1104, the UE determines the common TA based on satellite ephemeris, and/or cell-specific residual common TA, and/or the scalar of common TA, as the aforementioned equation for common TA $T_c$. At operation 1106, the UE adjusts common TA and transmits PRACH. At operation 1108, the UE receives the RAR including the UE-specific TA and/or frequency offset to be compensated at the UE side. At operation 1110, the UE adjusts UE-specific TA and pre-compensates the frequency offset for uplink transmission based on the indication in RAR. As discussed herein, GNSS is used one an example of a type of communication satellite system and any other type of communication satellite system (e.g., GPS, GLONASS, Galileo, BeiDou-2, Iridium, etc.) could be used. Additionally, GNSS capable/incapable are used as examples of UEs that can and cannot localize and/or communicate directly, at least in some manner, with the communication satellite.

Figure 12:
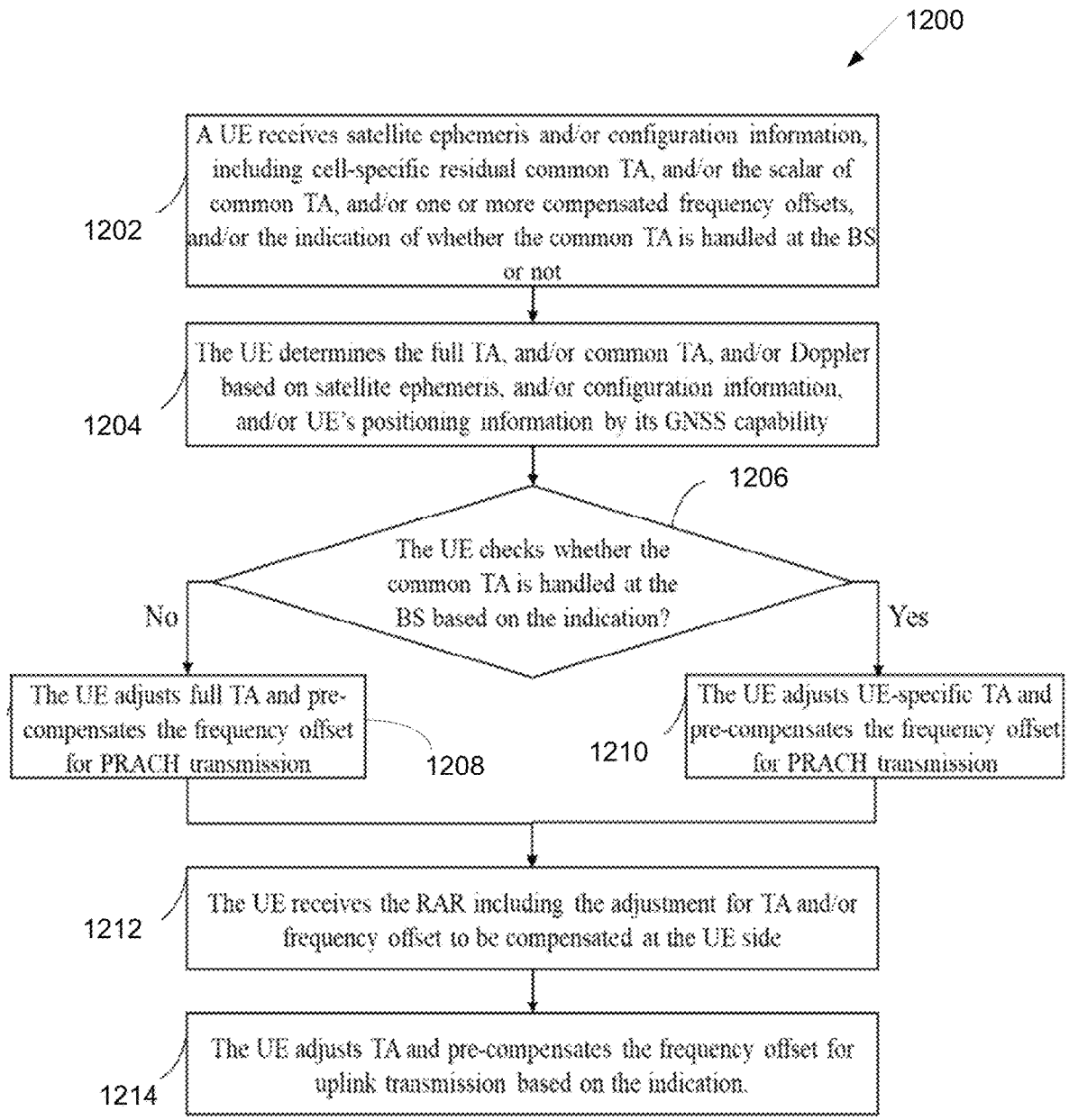
FIG. 12 illustrates a flowchart of a method for GNSS-capable UE in an initial access according to embodiments of the present disclosure.

FIG. 12 illustrates a flowchart of a method 1200 for GNSS-capable UE in an initial access according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. For example, the method 1200 may be performed by the UE 116.

As illustrated in FIG. 12, at operation 1202, a UE receives satellite ephemeris and/or configuration information including the cell-specific residual common TA, and/or the scalar of common TA, and/or one or more compensated frequency offset values, and/or the indication of whether the common TA is handled at the BS or not. Whether the common TA is handled at the BS can be indicated by one bit in system information, e.g., MIB, SIB1, other SIB s and/or a new SIB. For instance, the IE servingCellConfigCommonSIB in SIB1 can be modified by adding this one-bit indication.

At operation 1204, the UE determines the full TA, and/or common TA, and/or Doppler, based on the received satellite ephemeris, and/or the configuration information, and UE's positioning information by GNSS capability of the UE. Specifically, the GNSS-capable UE has the knowledge of the position of the UE and is able to be determine the full TA and Doppler shift based on the satellite coordinate and velocity included in the ephemeris information. Based on the Doppler and the indication of compensated frequency offset value, the UE can determine the residual frequency offset to be compensated. The UE can determine the common TA based on the indication of cell-specific residual common TA and the scalar of common TA, as the aforementioned equation for common TA $T_c$.

At operation 1206, the UE checks whether the common TA is handled at the BS or not based on the indication. If the common TA is not handled at the BS, at operation 1208, the UE adjusts full TA and pre-compensates the frequency offset for PRACH transmission. If the common TA is handled at the BS, at operation 1210, the UE adjusts the specific TA of the UE and pre-compensates the frequency offset for PRACH transmission. At operation 1212, the UE receives the RAR including the TA adjustment and/or frequency offset to be compensated at the UE side. At operation 1214, the UE adjusts TA and pre-compensates the frequency offset for uplink transmission based on the indication in RAR.

In another example, at operation 1206, whether the common TA is handled at the BS can be predefined so that the UE can operate accordingly. For instance, the GNSS-capable UE can compensate the UE-specific TA if it is predefined that the common TA is handled at the BS. In another case that it is predefined that the common TA is not handled at the BS, then the UE can compensate the full TA.

In one embodiment, UL timing and frequency synchronization for a connected UE are provided.

For a connected UE, the BS transmits information that enables the UE to adjust TA and compensate frequency offset for UL transmissions. In case of LEO/MEO satellite communication systems, the satellite moves fast relative to the UE. The TA and Doppler shift are varying over time rapidly. In addition to the TAC in MAC CE that is used to indicate the amount of timing adjustment, the BS can indicate the TA variation rate that enables the UE to adjust TA autonomously based on the current TA and the TA variation rate. The BS can also indicate the amount of frequency offset that enables the UE to determine the value of frequency pre-compensation.

Figure 13:
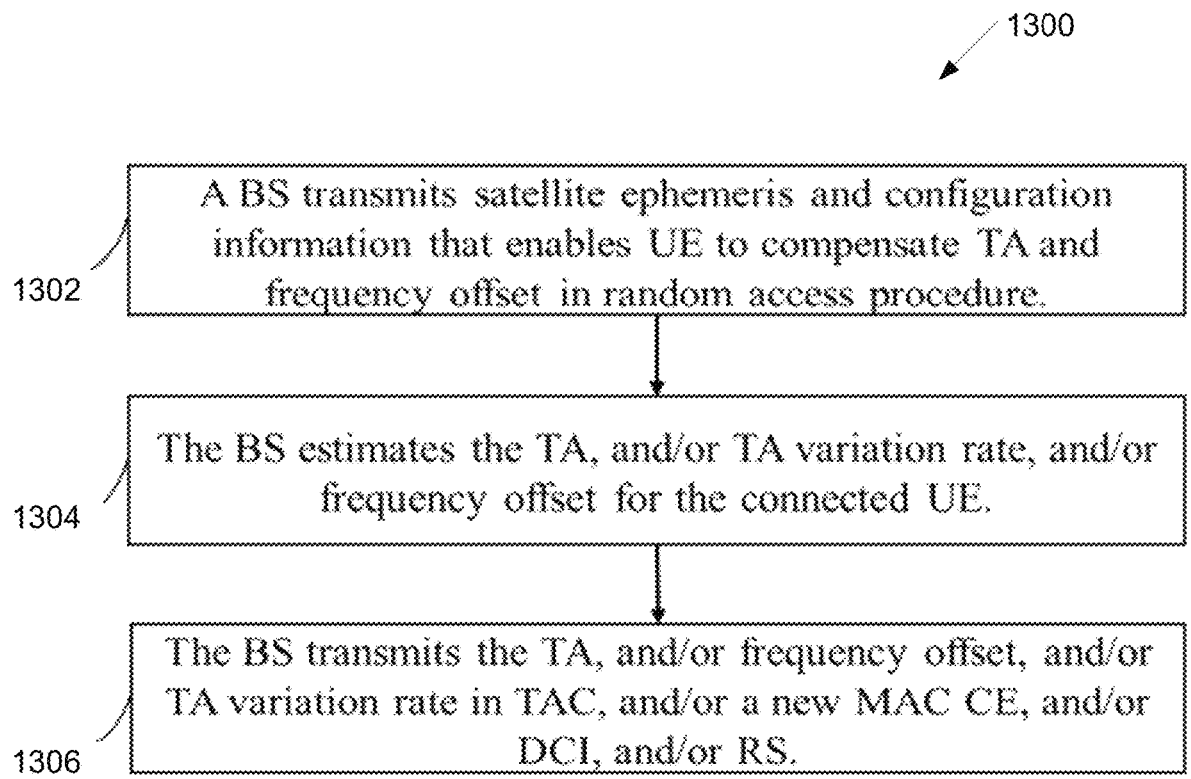
FIG. 13 illustrates a flowchart of a method of BS for TA and frequency synchronization for connected UE access according to embodiments of the present disclosure.

FIG. 13 illustrates a flowchart of a method 1300 of BS for TA and frequency synchronization for a connected UE access according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. For example, the method 1300 may be performed by the BS 102.

As illustrated in FIG. 13, at operation 1302, a BS transmits satellite ephemeris and configuration information that enables the UE to compensate TA and frequency offset for UL transmissions in random access procedure. At operation 1304, the BS estimates the TA, and/or TA variation rate, and/or frequency offset for the connected UE. At operation 1306, the BS transmits the TA, and/or frequency offset value, and/or TA variation rate in TAC, and/or a new MAC CE, and/or DCI, and/or RS.

Figure 14:
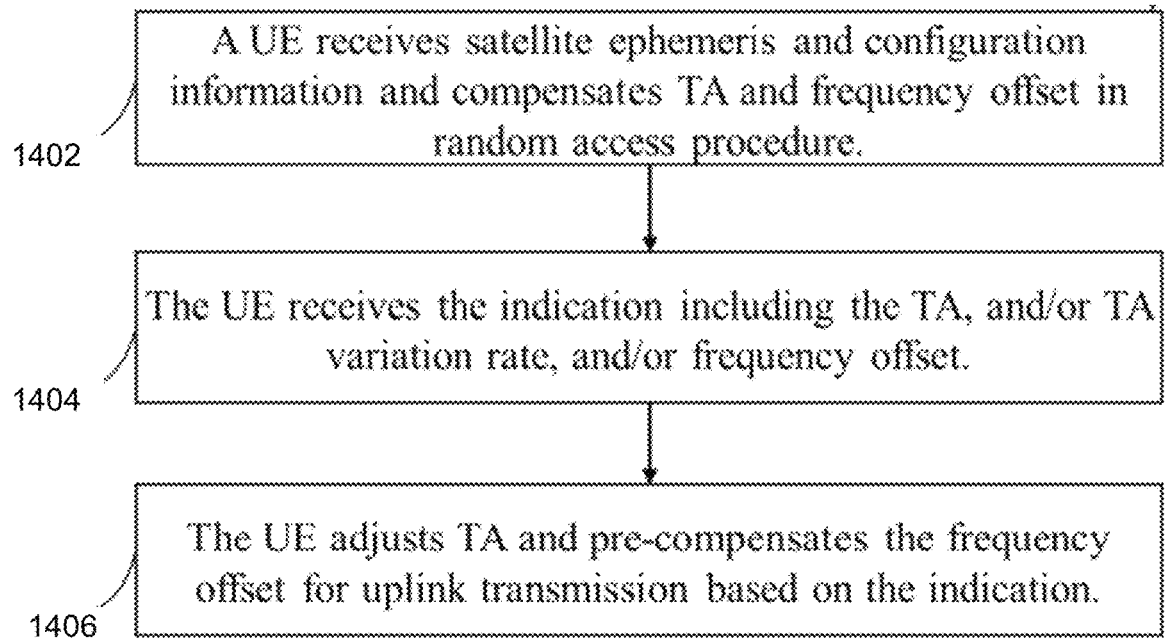
FIG. 14 illustrates a flowchart of a method of UE for TA and frequency synchronization in connected mode according to embodiments of the present disclosure.

FIG. 14 illustrates a flowchart of a method 1400 of UE for TA and frequency synchronization in connected mode according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. For example, the method 1400 may be performed by the UE 116.

As illustrated in FIG. 14, at operation 1402, a UE receives satellite ephemeris and configuration information, and compensates TA and frequency offset in random access procedure. At operation 1404, the UE receives the indication including the TA, and/or TA variation rate, and/or frequency offset value. At operation 1406, the UE adjusts TA and pre-compensates the frequency offset for an uplink transmission based on the indication.

In one embodiment, an indication of TA variation rate and/or Doppler shift for connected UE is provided.

In one embodiment of operation 1306 as illustrated in 1306, the TA variation rate and the Doppler shift can be jointly indicated. In one example, the TA variation rate, $r_{TA}$, and the Doppler shift, $f_D$, due to the movement of the satellite are given by:

$$r_{TA} = \frac{v}{c}\cos\omega, \quad f_D = f_c \frac{v}{c}\cos\omega,$$

where v is the speed of satellite, i.e., $$v = \sqrt{\frac{GM_E}{(R+h)}},$$

c is the speed of light, ω is the angle between the satellite velocity and the LOS from the satellite to the UE, and $f_c$ is the carrier frequency. Based on the above equations for TA variation rate and Doppler shift, the UE can determine the Doppler shift if the TA variation rate is indicated. Alternatively, the UE can determine the TA variation rate if the Doppler value is given. The UE can also determine both the TA variation rate and the Doppler value based on the received satellite ephemeris information if the value of ω or cos ω is provided. Thus, the TA variation rate and the Doppler shift can be jointly signaled to the UE by indicating either the TA variation rate $r_{TA}$, or the Doppler value $f_D$, or the value of ω or cos ω, where in each case the indication includes the positive or the negative sign for the value. Based on the TA variation rate and the current TA, the UE can adjust TA autonomously. Based on the Doppler shift $f_D$ and the compensated frequency offset indicated by the BS, the UE can determine the residual Doppler and pre-compensate the UL transmission.

In one embodiment of operation 1306, the BS can indicate the TA variation and Doppler information by DCI in PDCCH. A new DCI format can be introduced for UE-specific indication, where the CRC is scrambled by C-RNTI. For example, the size of the new DCI format can be L1 bits, which is different from DCI format 0_0 or 0_1. L2 bits out of the L1 bits can be used for the TA variation rate and/or Doppler indication. The other bits can be reserved to certain value, e.g., predefined to all "0."

Alternatively, a group-common DCI can be adopted to indicate the TA variation and Doppler information to a group of UEs located in a certain area in the cell that are experiencing a similar TA variation rate and/or Doppler shift. The group-common DCI can have the same format as the existing DCI, e.g., DCI format 2_2, or can use a new DCI format. The size of the group-common DCI can be Q1 bits, where Q2 bits out of the Q1 bits can be used for the TA variation rate and/or Doppler indication, and the other bits can be reserved to certain value, e.g., predefined to all "0." A new group-specific RNTI, namely, TA variation and Doppler indication (TDI)-RNTI, can be defined, e.g., using value 0001-FFEF or the reserved value FFF0-FFFD. The BS can configure the UE with the TDI-RNTI via RRC configuration. TABLE 6 shows an example of modifying IE PhysicalCellGroupConfig to configure TDI-RNTI.

TABLE 6

An example of IE PhysicalCellGroupConfig modification to configure TDI-RNTI

| PhysicalCellGroupConfig ::= | SEQUENCE { | | |
|---|---|---|---|
| ... | | | |
| tpc-SRS-RNTI | RNTI-Value | OPTIONAL, | -- Need R |
| tpc-PUCCH-RNTI | RNTI-Value | OPTIONAL, | -- Need R |
| tpc-PUSCH-RNTI | RNTI-Value | OPTIONAL, | -- Need R |
| sp-CSI-RNTI | RNTI-Value | OPTIONAL, | -- Need R |
| CS-RNTI | SetupRelease { RNTI-Value} OPTIONAL,-- Need M | | |
| tdi-RNTI | RNTI-Value  OPTIONAL,  -- Need R | | |
| ... | | | |
| } | | | |

Another example is to indicate the TA variation and Doppler information in TAC MAC CE in PDSCH. An example is to extend the size of TAC MAC CE for TA variation and Doppler indication.

Figure 15:
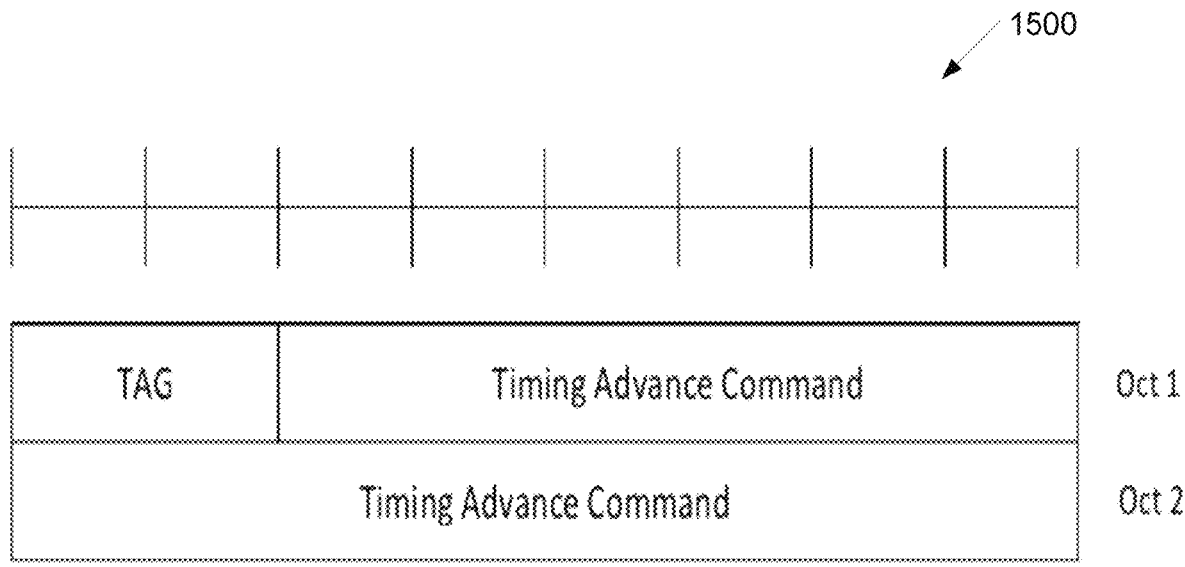
FIG. 15 illustrates an example extending of the size of TAC media access control control element (MAC CE) for TA variation and Doppler indication according to embodiments of the present disclosure.

FIG. 15 illustrates an example extending of the size of TAC MAC CE for TA variation and Doppler indication 1500 according to embodiments of the present disclosure. An embodiment of the extending of the size of TAC MAC CE for TA variation and Doppler indication 1500 shown in FIG. 15 is for illustration only.

Alternatively, a new MAC subPDU with TDI MAC CE can be defined. In one example, the new MAC subPDU can be placed after the current TAC MAC CE.

The PDSCH carrying the TAC MAC CE and/or TDI MAC CE can be scheduled by UE-specific DCI or group-common DCI with TDI-RNTI. If UE-specific DCI is used for scheduling, TAC MAC CE and/or TDI MAC CE is UE-specific. If group-common DCI with TDI-RNTI is used for scheduling, TAC MAC CE and/or TDI MAC CE is intended for the group of UEs configured with the same TDI-RNTI.

One another example is to use the reference signal (RS), e.g., DMRS, to indicate TA variation and Doppler information. The PDCCH DMRS scrambling ID, $N_{ID} \in \{0, 1, \ldots, 65535\}$, is used to generate the DMRS sequence if provided, which can be used to include TA variation and Doppler information. For instance, when conveying K bits by DMRS, $2^K$ scrambling IDs can be configured by the higher-layer parameter pdcch-DMRS-ScramblingID. Alternatively, the DMRS can be used to convey part of the information of TA variation and Doppler, and the rest of the information can be indicated in DCI or MAC CE as aforementioned. TA variation and Doppler information can also be transmitted by other RSs, e.g., PTRS, or by introducing a new RS.

As provided in the aforementioned embodiments and/or examples, the specific information for the TA variation and Doppler indication can be the TA variation rate, and/or frequency offset value to be compensated, and/or Doppler shift value, and/or ω or cos ω, for each of which the sign is included in the indication, as discussed above.

Figure 16:
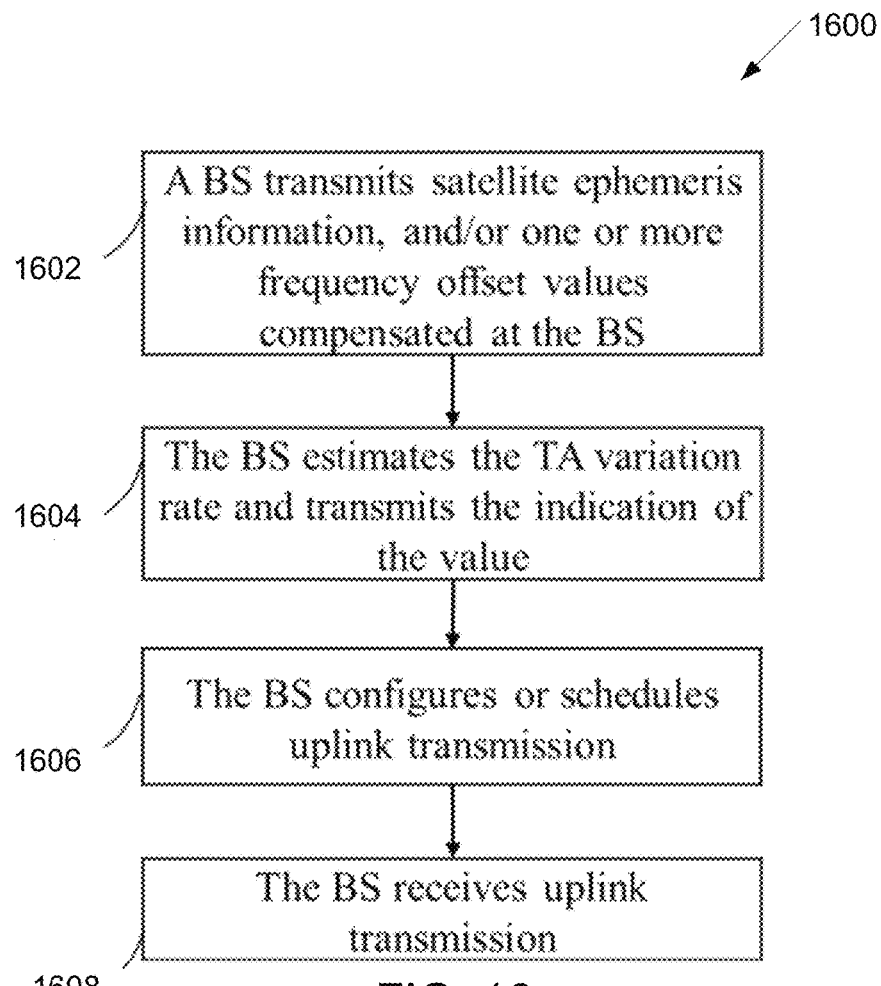
FIG. 16 illustrates a flowchart of a method of BS operation for GNSS-incapable UEs in a connected mode according to embodiments of the present disclosure.

FIG. 16 illustrates a flowchart of a method 1600 of BS operation for GNSS-incapable UEs in a connected mode according to embodiments of the present disclosure. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. For example, the method 1600 may be performed by the BS 102.

As illustrated in FIG. 16, the TA variation rate is estimated and indicated to UE. Alternative examples are to indicate the Doppler shift or the value of ω or the value of cos ω as disclosed above. At operation 1602, a BS transmits satellite ephemeris information, and/or one or more frequency offset values compensated at the BS. At operation 1604, the BS estimates the TA variation rate and transmits the indication of the value. One embodiment is that the BS estimates the Doppler shift, or equivalently the TA variation rate, by SRS, and transmits the indication of the value. The indication can be included in DCI, and/or MAC CE, and/or RS as mentioned in the examples above. At operation 1606, the BS configures or schedules uplink transmission. At operation 1608, the BS receives uplink transmission.

Figure 17:
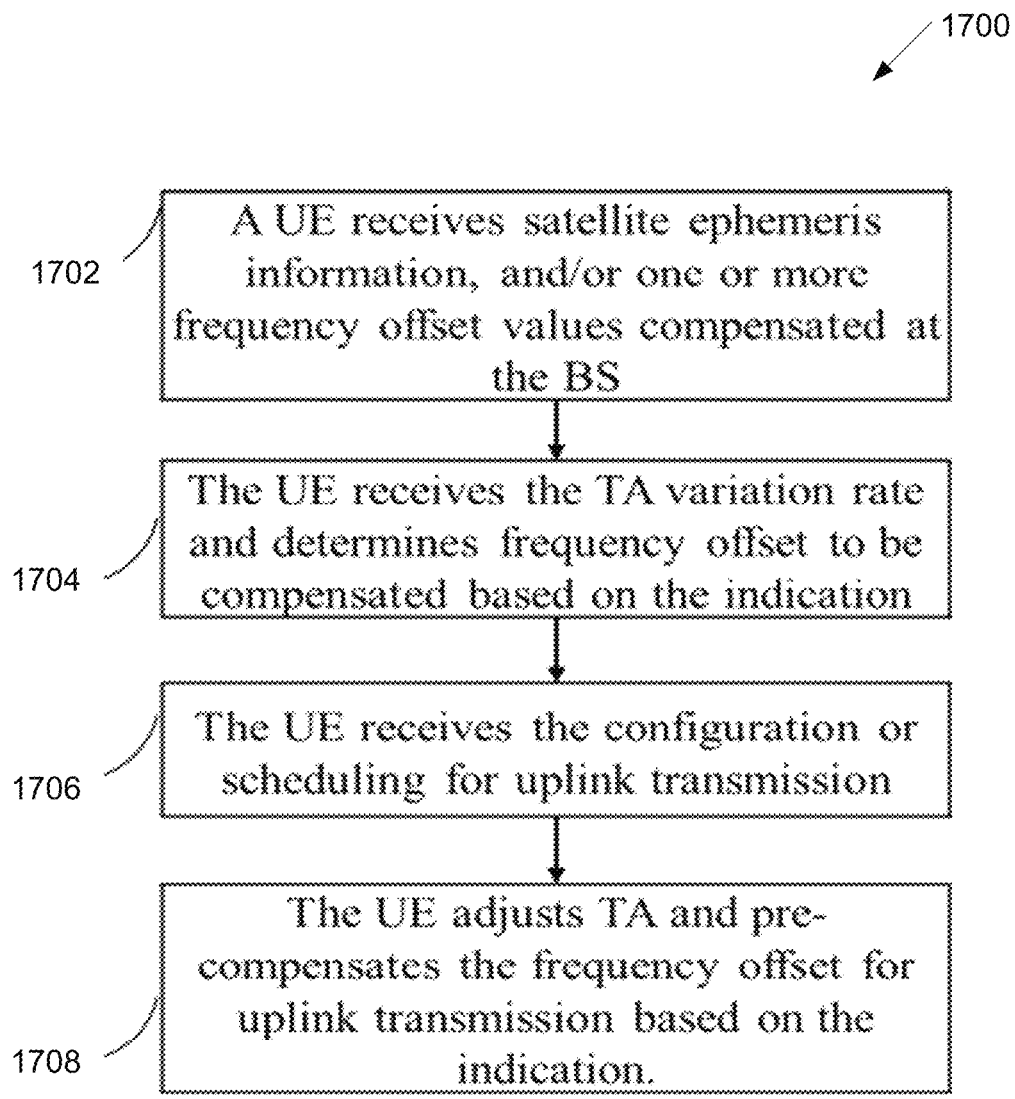
FIG. 17 illustrates a flowchart of a method for GNSS-incapable UE in a connected mode according to embodiments of the present disclosure.

FIG. 17 illustrates a flowchart of a method 1700 for GNSS-incapable UE in a connected mode according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. For example, the method 1700 may be performed by the UE 116.

As illustrated in FIG. 17, at operation 1702, the UE receives the satellite ephemeris information and/or the indication of one or more frequency offset values compensated at the BS, which can be received in system information, e.g., MIB, SIB1, other SIB s and/or a new SIB, in initial access. At operation 1704, the UE receives the TA variation rate and determines the amount of frequency offset to be compensated based on the indication. The indication of TA variation rate can be received in DCI, and/or MAC CE, and/or RS as mentioned in the examples above. At operation 1706, the UE receives the configuration or scheduling for uplink transmission. At operation 1708, the UE adjusts TA and pre-compensates the frequency offset for uplink transmission based on the indication.

Figure 18:
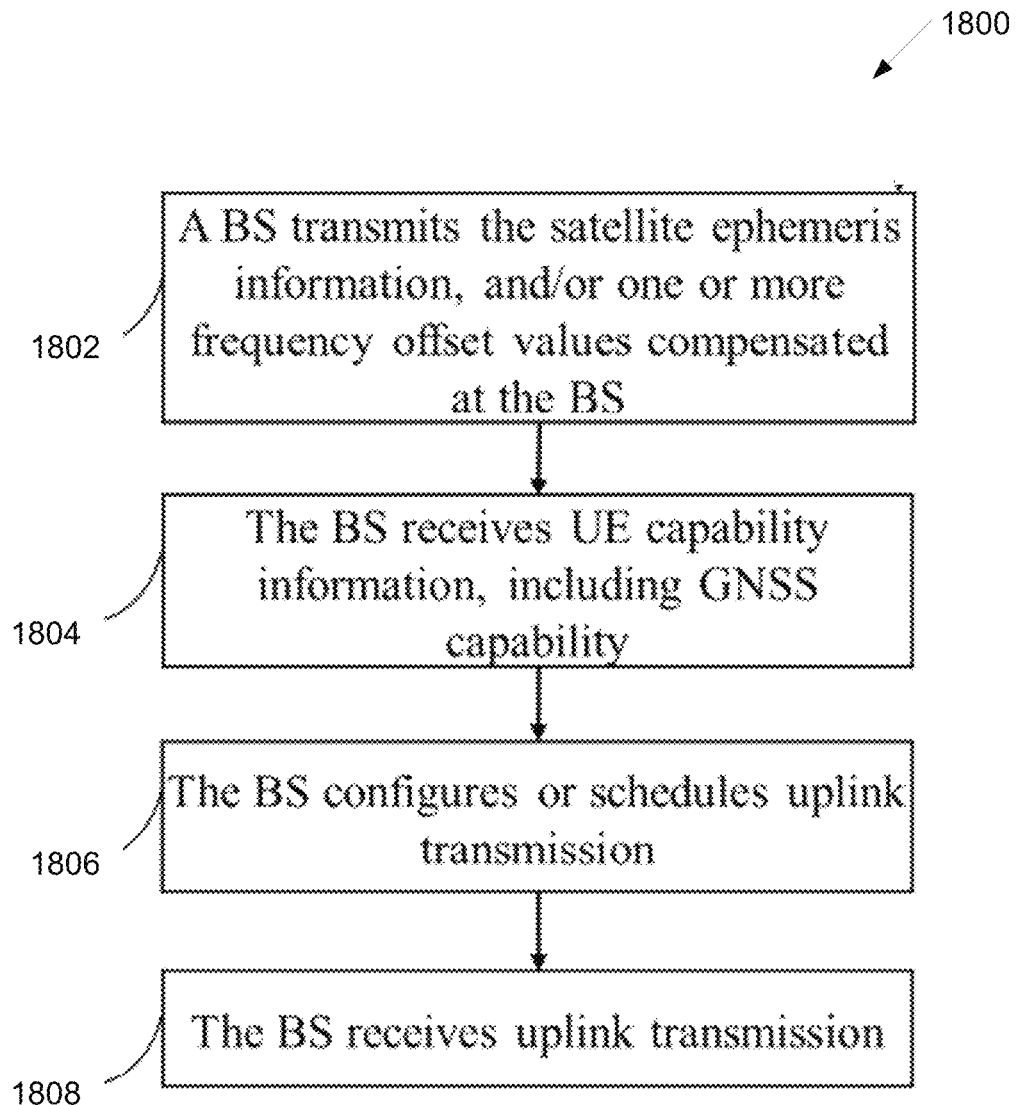
FIG. 18 illustrates a flowchart of a method of BS operation for GNSS-capable UEs in a connected mode according to embodiments of the present disclosure.

FIG. 18 illustrates a flowchart of a method 1800 of BS operation for GNSS-capable UEs in a connected mode according to embodiments of the present disclosure. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. For example, the method 1800 may be performed by the BS 102.

As illustrated in FIG. 18, at operation 1802, the BS transmits the satellite ephemeris information, and/or one or more frequency offset values compensated at the BS. At operation 1804, the BS receives the UE capability indication, including GNSS capability. At operation 1806, the BS configures or schedules uplink transmission. At operation 1808, the BS receives uplink transmission.

Figure 19:
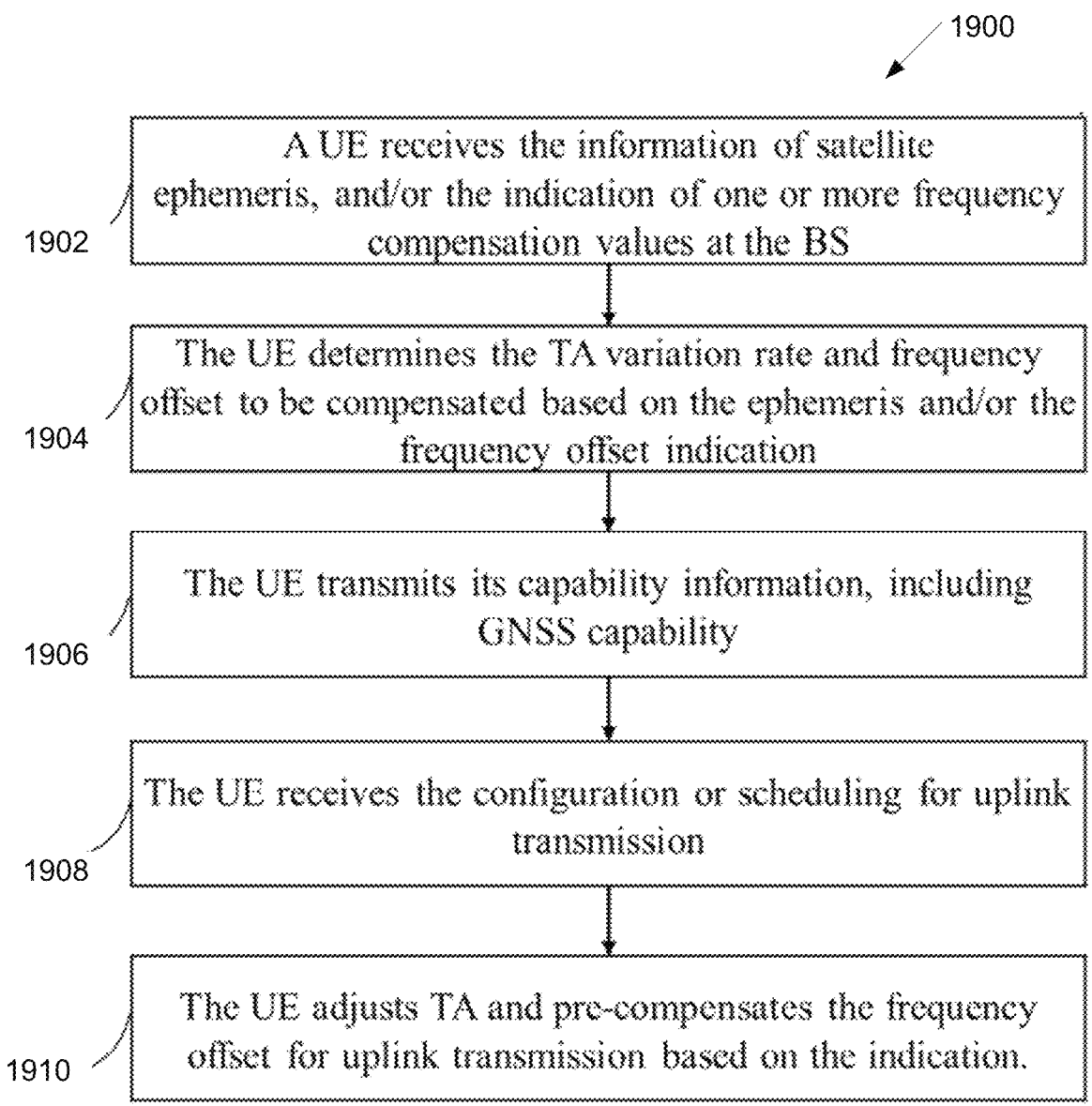
FIG. 19 illustrates a flowchart of a method for GNSS-capable UE in a connected mode according to embodiments of the present disclosure.

FIG. 19 illustrates a flowchart of a method 1900 for GNSS-capable UE in a connected mode according to embodiments of the present disclosure. An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. For example, the method 1900 may be performed by the UE 116.

As illustrated in FIG. 19, at operation 1902, the UE receives the satellite ephemeris information, and/or the indication of one or more frequency offset values compensated at the BS. At operation 1904, the UE determines the TA variation rate and frequency offset to be compensated based on the ephemeris and/or the frequency offset indication. The GNSS-capable UE has the knowledge of the position of the UE and is able to be determine TA variation rate of the UE and Doppler shift based on the satellite coordinate and velocity included in the ephemeris information. Based on the Doppler and the indication of frequency offset value compensated at the BS, the UE can determine the residual frequency offset to be compensated. At operation 1906, the UE transmits capability information of the UE, including GNSS capability. At operation 1908, the UE receives the configuration or scheduling for uplink transmission. At operation 1910, the UE adjusts TA and pre-compensates the frequency offset for uplink transmission based on the indication.

In one embodiment, PRACH resource allocation for an initial access is provided.

The BS can accommodate the GNSS capability of a UE when performing PRACH resource allocation for initial access. For example, the BS can assign one set of PRACH time resources to all GNSS-capable UEs and an orthogonal set of PRACH time resources to all GNSS-incapable UEs. A GNSS-capable UE can determine the time and frequency pre-compensation that the GNSS-capable UE may apply when transmitting the PRACH preamble of the GNSS-capable UE, which can result in improved preamble detection performance for all GNSS-capable UEs. Also, the PRACH preamble transmissions from GNSS-capable UEs may not interfere with PRACH preamble transmissions from GNSS-incapable UEs, which can result in improved preamble detection performance for all GNSS-incapable UEs.

Figure 20:
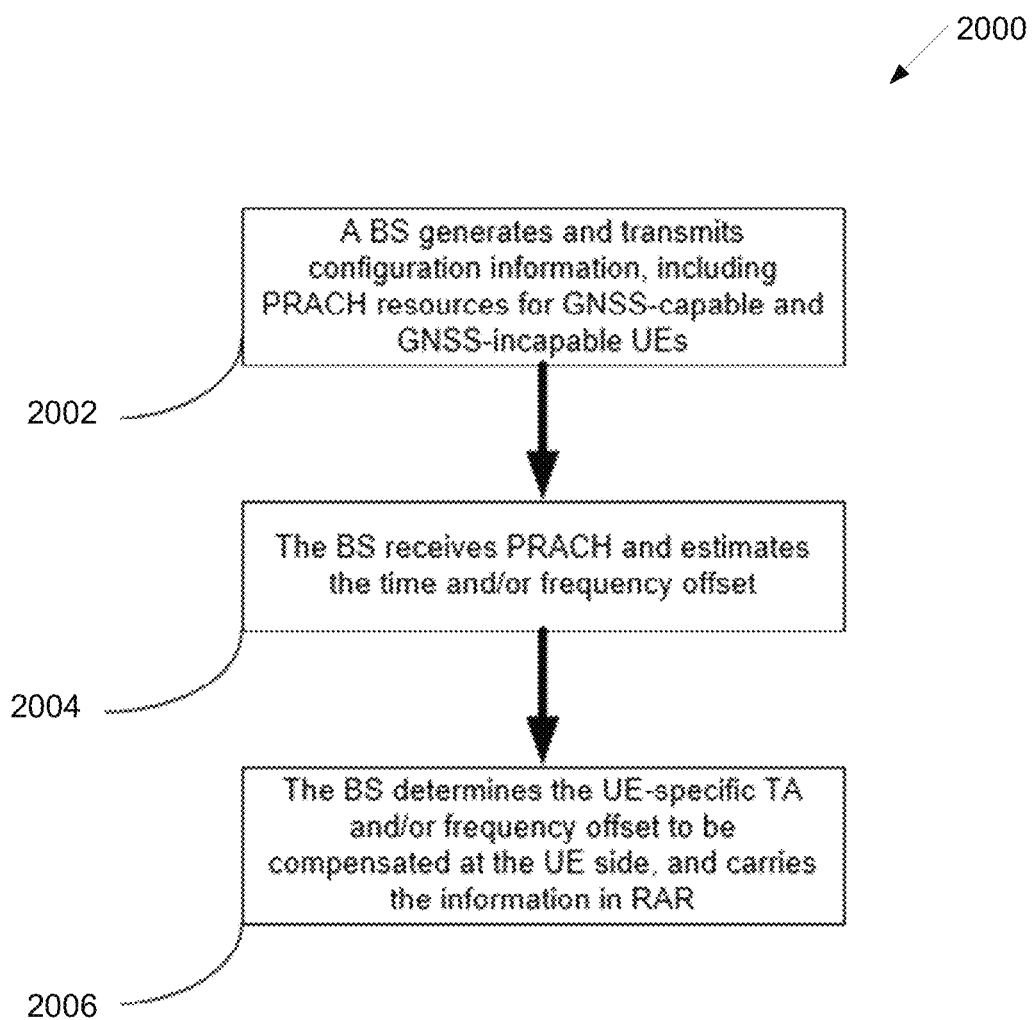
FIG. 20 illustrates a flowchart of a method of BS operation in an initial access according to embodiments of the present disclosure.

FIG. 20 illustrates a flowchart of a method 2000 of BS operation in an initial access according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. For example, the method 2000 may be performed by the BS 102.

As illustrated in FIG. 20, at operation 1402, a BS generates and transmits configuration information including PRACH resources for GNSS-capable and GNSS-incapable UEs. At operation 1404, the BS receives PRACH and estimates the time and/or frequency offset. At operation 1406, the BS determines the UE-specific TA and/or frequency offset to be compensated at the UE side, and carries the information in RAR.

Figure 21:
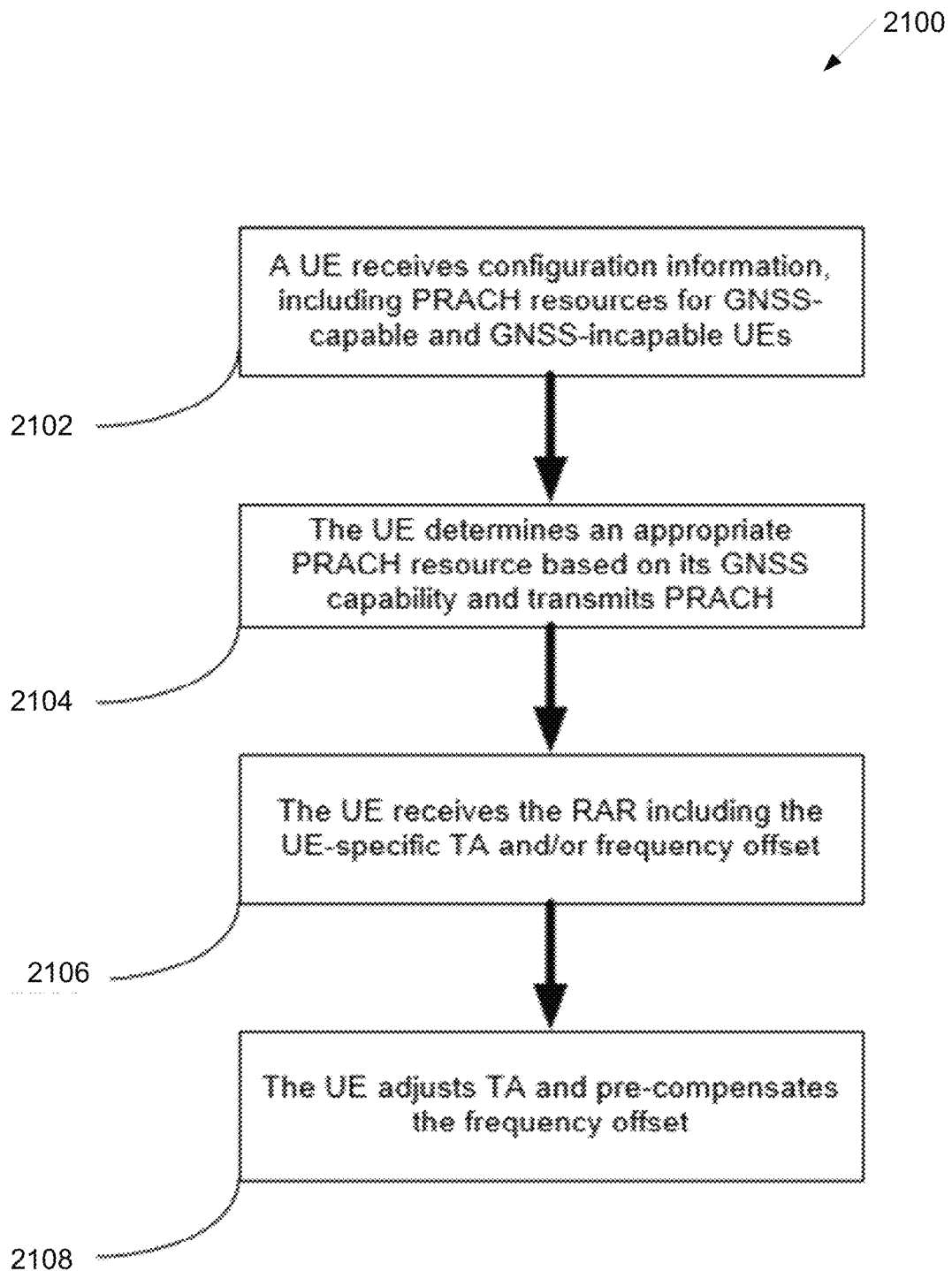
FIG. 21 illustrates a flowchart of a method of UE operation in an initial access according to embodiments of the present disclosure.

FIG. 21 illustrates a flowchart of a method 2100 of UE operation in an initial access according to embodiments of the present disclosure. An embodiment of the method 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. For example, the method 2100 may be performed by the UE 116.

As illustrated in FIG. 21, at operation 2102, a UE receives configuration information including PRACH resources for GNSS-capable and GNSS-incapable UEs. At operation 2104, the UE determines an appropriate PRACH resource based on the GNSS capability of the UE and uses that resource to transmit the PRACH preamble of the UE. At operation 2106, the UE receives the RAR including the UE-specific TA and/or frequency offset. At operation 2108, the UE adjusts TA and pre-compensates the frequency offset.

PRACH resources for GNSS-capable and GNSS-incapable UEs can be indicated in system information, e.g., MIB, SIB1, other SIBs and/or a new SIB. An example of using SIB1 is given in TABLE 7, where the IE RACH-ConfigGeneric in SIB1 is modified. In this example, a GNSS-capable UE uses the parameter prach-ConfigurationIndexGNSS to select a PRACH resource, while a GNSS-incapable UE uses the parameter prach-ConfigurationIndexNonGNSS to select a PRACH resource.

TABLE 7

An example of IE RACH-ConfigGeneric modification for indication of PRACH resources

```
RACH-ConfigGeneric ::=      SEQUENCE {
    prach-ConfigurationIndex            INTEGER (0..255),
    prach-ConfigurationIndexGNSS        INTEGER (0..255),OPTIONAL,-- Need R
    prach-ConfigurationIndexNonGNSS INTEGER (0..255),OPTIONAL,-- Need R
    ...
}
```

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    a transceiver configured to receive, from a base station (BS), satellite ephemeris information of a satellite associated with the BS and common timing advance (TA) parameters; and
    a processor coupled with the transceiver and configured to:
        determine a TA based on a global navigation satellite system (GNSS) position of the UE, the satellite ephemeris information and the common TA parameters,
        determine a frequency shift based on the GNSS position and the satellite ephemeris information, and
        pre-compensate the TA and the frequency shift,
    wherein:
        the transceiver is further configured to perform an uplink transmission based on the pre-compensated TA and the pre-compensated frequency shift,
        the satellite ephemeris information includes position information, velocity information, and time information of the satellite,
        the common TA parameters includes TA variation rate,
        the position information of the satellite is indicated by a first set of parameters coordX, coordY, coordZ and a predefined step size $\Delta_c$ related to the position information of the satellite, and
        the velocity information of the satellite is indicated by a second set of parameters velocityX, velocityY, velocityZ and a predefined step size $\Delta_v$ related to the velocity information of the satellite.

2. The UE of claim 1, wherein the transceiver is further configured to transmit, to the BS, GNSS capability information of the UE.

3. The UE of claim 1, wherein the transceiver is further configured to transmit, to the BS, a physical random access channel (PRACH) based on the determined TA and the frequency shift.

4. A base station (BS) in a wireless communication system, the BS comprising:
    a transceiver configured to transmit, to a user equipment (UE), satellite ephemeris information of a satellite associated with the BS and common timing advance (TA) parameters,
    wherein a TA is determined based on a global navigation satellite system (GNSS) position of the UE, the satellite ephemeris information and the common TA parameters,
    wherein a frequency shift is based on the GNSS position and the satellite ephemeris information,
    wherein the TA and the frequency shift are pre-compensated,
    wherein an uplink transmission is performed based on the pre-compensated TA and the pre-compensated frequency shift, wherein the satellite ephemeris information includes position information, velocity information, and time information of the satellite, wherein the common TA parameters includes TA variation rate, wherein the position information of the satellite is indicated by a first set of parameters coordX, coordY, coordZ and a predefined step size $\Delta_c$ related to the position information of the satellite, and wherein the velocity information of the satellite is indicated by a second set of parameters velocityX, velocityY, velocityZ and a predefined step size $\Delta_v$ related to the velocity information of the satellite.

5. The BS of claim 4, wherein the transceiver is further configured to receive, from the UE, GNSS capability information of the UE.

6. The BS of claim 4, wherein the transceiver is further configured to receive, from the UE, a physical random access channel (PRACH) based on the determined TA and the frequency shift.

7. A method performed by a user equipment (UE) in a wireless communication system, the method comprising:
   receiving, from a base station (BS), satellite ephemeris information of a satellite associated with the BS and common timing advance (TA) parameters;
   determining, a TA based on a global navigation satellite system (GNSS) position of the UE, the satellite ephemeris information and the common TA parameters;
   determining, a frequency shift based on the GNSS position and the satellite ephemeris information;
   pre-compensating the TA and the frequency shift; and
   performing an uplink transmission based on the pre-compensated TA and the pre-compensated frequency shift,
   wherein:
   the satellite ephemeris information includes position information, velocity information, and time information of the satellite,
   the common TA parameters includes TA variation rate,
   the position information of the satellite is indicated by a first set of parameters coordX, coordY, coordZ and a predefined step size $\Delta_c$ related to the position information of the satellite, and the velocity information of the satellite is indicated by a second set of parameters velocityX, velocityY, velocityZ and a predefined step size $\Delta_v$ related to the velocity information of the satellite.

8. The method of claim 7, further comprising transmitting, to the BS, GNSS capability information of the UE.

9. The method of claim 7, further comprising transmitting, to the BS, a physical random access channel (PRACH) based on the determined TA and the frequency shift.

10. A method performed by a base station (BS) in a wireless communication system, the method comprising:
    transmitting, to a user equipment (UE), satellite ephemeris information of a satellite associated with the BS and common timing advance (TA) parameters,
    wherein a TA is determined based on a global navigation satellite system (GNSS) position of the UE, the satellite ephemeris information and the common TA parameters,
    wherein a frequency shift is determined based on the GNSS position and the satellite ephemeris information,
    wherein the TA and the frequency shift are pre-compensated,
    wherein an uplink transmission is performed based on the pre-compensated TA and the pre-compensated frequency shift,
    wherein the satellite ephemeris information includes position information, velocity information, and time information of the satellite,
    wherein the common TA parameters includes TA variation rate,
    wherein the position information of the satellite is indicated by a first set of parameters coordX, coordY, coordZ and a predefined step size $\Delta_c$ related to the position information of the satellite, and
    wherein the velocity information of the satellite is indicated by a second set of parameters velocityX, velocityY, velocityZ and a predefined step size $\Delta_v$ related to the velocity information of the satellite.

11. The method of claim 10, further comprising receiving, from the UE, GNSS capability information of the UE.

12. The method of claim 10, further comprising receiving, from the UE, a physical random access channel (PRACH) based on the determined TA and the frequency shift.

* * * * *